US010223715B2

(12) United States Patent
Harris

(10) Patent No.: US 10,223,715 B2
(45) Date of Patent: Mar. 5, 2019

(54) LOCAL PAYMENT COLLECTION AND INFORMATION MANAGEMENT APPARATUS AND METHOD

(76) Inventor: Debi Gean Harris, Odessa, TX (US)

(*) Notice: Subject to any disclaimer, the term of this patent is extended or adjusted under 35 U.S.C. 154(b) by 325 days.

(21) Appl. No.: 13/117,734

(22) Filed: May 27, 2011

(65) Prior Publication Data

US 2011/0295662 A1 Dec. 1, 2011

Related U.S. Application Data

(60) Provisional application No. 61/349,590, filed on May 28, 2010.

(51) Int. Cl.
*G06Q 40/00* (2012.01)
*G06Q 30/04* (2012.01)
*G06Q 20/10* (2012.01)
*G06Q 30/02* (2012.01)
*G06Q 40/02* (2012.01)

(52) U.S. Cl.
CPC ............ *G06Q 30/04* (2013.01); *G06Q 20/10* (2013.01); *G06Q 30/0241* (2013.01); *G06Q 40/02* (2013.01)

(58) Field of Classification Search
CPC ..................................................... G06Q 30/04
USPC ................................. 705/1–50; 235/379–380
See application file for complete search history.

(56) References Cited

U.S. PATENT DOCUMENTS

| 5,570,465 A | 10/1996 | Tsakanikas |
| 6,023,687 A | 2/2000 | Weatherly et al. |
| 6,738,751 B1 | 5/2004 | Richiusa |
| 6,917,853 B2 | 7/2005 | Chirnomas |
| 7,337,143 B2 | 2/2008 | Iwase |
| 7,389,916 B2 | 6/2008 | Chirnomas |
| 7,568,615 B2* | 8/2009 | Corona et al. ................ 235/379 |
| 8,561,887 B1* | 10/2013 | Kovacs .............. G07D 11/0063 235/379 |
| 2002/0147680 A1 | 10/2002 | Cho et al. |
| 2002/0152123 A1 | 10/2002 | Giordano et al. |

(Continued)

OTHER PUBLICATIONS

Basics, Good Timing Extend Fifth Third's Profit Streak: [Final / All Edition] Author: Mary Vanac Plain Dealer Reporter. Publication info: The Plain Dealer [Cleveland, Ohio] Jun. 23, 2000: 3S. (Year: 2000).*

*Primary Examiner* — Bruce I Ebersman
*Assistant Examiner* — John A Anderson
(74) *Attorney, Agent, or Firm* — Sean Christian Connolly

(57) ABSTRACT

An apparatus for collecting payments and managing information, which allows for a payment to be made when the payee is not present and makes a record of the same, and a method is provided. The apparatus comprises a payer interface, a system for receiving payments, a secure lock box for storing payments, and a system for retaining and retrieving information. The payer identifies the payment to be made, enters the type of payment and the amount and submits the payment, which is scanned. The information entered or scanned is stored in a database. The apparatus securely stores the payment and issues a receipt with payment information and images of the payment made. The payee may access the database records and obtain the payments at a later time. The apparatus allows low-income payers, who may not have access to bank accounts or credit cards, to submit cash payments when the payee is unavailable.

9 Claims, 16 Drawing Sheets

(56) References Cited

U.S. PATENT DOCUMENTS

| | | | |
|---|---|---|---|
| 2003/0046226 A1 | 3/2003 | Iue et al. | |
| 2003/0093289 A1 | 5/2003 | Thornley et al. | |
| 2003/0154093 A1 | 8/2003 | Chirnomas | |
| 2003/0200107 A1* | 10/2003 | Allen | G06Q 10/10 705/35 |
| 2005/0060210 A1 | 3/2005 | Levi et al. | |
| 2005/0091117 A1 | 4/2005 | Philips et al. | |
| 2005/0102152 A1 | 5/2005 | Hodges | |
| 2005/0137942 A1* | 6/2005 | LaFleur | G07G 1/0018 705/26.1 |
| 2006/0064201 A1 | 3/2006 | Chirnomas | |
| 2006/0074802 A1 | 4/2006 | Hall et al. | |
| 2006/0129482 A1 | 6/2006 | Etzkorn | |
| 2006/0178986 A1 | 8/2006 | Giordano et al. | |
| 2006/0212393 A1 | 9/2006 | Brown | |
| 2007/0045395 A1* | 3/2007 | Corona | G06Q 20/10 235/379 |
| 2007/0235520 A1* | 10/2007 | Smith et al. | 235/379 |
| 2009/0012878 A1* | 1/2009 | Tedesco | G06Q 30/06 705/26.41 |
| 2009/0289105 A1* | 11/2009 | Block et al. | 235/379 |
| 2010/0138259 A1* | 6/2010 | Delk | G06Q 10/087 705/314 |
| 2010/0138342 A1* | 6/2010 | Amann et al. | 705/43 |
| 2011/0055084 A1* | 3/2011 | Singh | 705/43 |
| 2013/0317644 A1* | 11/2013 | DeLucia | A47F 9/047 700/232 |

* cited by examiner

LOCAL PAYMENT COLLECTION AND INFORMATION MANAGEMENT APPARATUS AND METHOD

CROSS-REFERENCE TO RELATED APPLICATIONS

This application claims benefit of U.S. Provisional Patent Application No. 61/349,590 which was filed on May 28, 2010, and which is incorporated herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of payment systems. More particularly, the preferred embodiments of the present invention relate generally to payment systems which allow a payer to pay an absent payee. More particularly, the preferred embodiments of the present invention relate generally to payment systems which allow payers who are unable to obtain bank accounts, or use other modern payment means, such as the Automated Teller Machine system, credit card processing systems, or the like, to pay absent payees. Furthermore, the preferred embodiments of the present invention relate generally to payment systems which also provide information to users, such as marketing material, promotional material, directions, account history, historical data, instructional information, useful facts and/or helpful information, and gather information for controllers of the system for management or accounting purposes. Additionally, the present invention relates generally to a method of paying absent payees.

2. Description of the Related Art

Over time, the number of means by which a payment can be made to a payee has increased. Submission of cash currency has been an option since the onset of financial systems; however, transporting cash currency is fraught with the risk of loss, damage and theft, and physically securing cash, especially large quantities of it, are difficult and problematic. Negotiable instruments, such as checks and promissory notes, evolved to ease the transfer of funds, especially over long distances.

Many of the recent innovations in payment methods allow for payers to pay in instances in which the payee is not present. Payments may be submitted to an absent payee in a variety of ways. Payments may be submitted electronically using an electronic funds transfer between bank accounts or a credit card processing system. Payers who possess bank accounts may write checks and mail them to the payee or deliver them to the payee. Payers may also obtain a cashier's check from a third party, usually for a fee. Payers may use web-enabled software to submit a payment over the internet; however, many people do not own a computer or have easy access to one. Cash may be also be submitted and collected later by the payee; however, cash submissions to absent payees are problematic because cash may not be mailed and may not be easily secured if given to an intermediary.

Not every member of society has easy access to modern payment means. Some people may not be able to obtain bank accounts because they cannot maintain a minimum balance or have other barriers which prevent them from obtaining one. A minimum balance may not be maintainable because of low income or a high degree of debt. Improper identification may also hamper the ability to obtain a bank account. People who have difficulty in establishing bank accounts may not be able to open even temporary accounts which allow cash payments to be paid over an ATM system. People living in rural areas may have limited physical access to banks simply because they are scarce in those areas. Some banks limit the ability to receive cashier's checks to those who possess accounts.

Moreover, some people also have difficulty obtaining credit cards. They may not be able to qualify for a credit card because of low income, high debt levels, poor credit scores, a lack of credit, or identification problems. Some users of credit cards simply cannot afford the fees. Even credit fraud on the part of others can affect the ability to obtain credit.

People who are not able to obtain bank accounts or credit may be able to find a bank to issue a cashier's check, but they must travel to that bank and pay a fee for the cashier's check. People with low income may not have the ability to travel easily or may not be able to afford to travel. Additionally, any additional fees would be a burden on their already low income.

Cash may also be converted into a money order; however, a third party must be involved to issue the money order, and these third parties almost always charge fees. As with the cashier's check, the payer who wishes to obtain a money order must travel to an establishment that provides money order service and incur travel expenses that a low income person may not be able to afford. The low income person may also lack the ability to travel. Money orders may only be issued for limited amounts, and these amounts may be less than the payment which the payer needs to submit.

Businesses which cater to low income customers, such as low income housing, temporary residences, rental services, rent-to-own services, pay day loan services, pawn shops or the like, are often faced with difficulty in obtaining payment from their customers. Collecting payment at all may be difficult because the payer lacks the necessary funds. Low income customers may submit a payment using multiple payment means, such as a combination of payment types. Payment portions may be submitted at different times because low income customers may not have the entire payment when it is due or must pay portions in advance. Often, low income customers submit payments in cash only and in low denomination bills, which increase the physical volume of cash which must be collected by a payee. Collecting such payments exposes the payee to danger while collecting the payment and makes the payee a potential target for theft or other crimes. Furthermore, businesses which cater to low income customers encounter difficulties in maintaining accurate records. The combination of payment types or multiple payment portions can make record-keeping difficult for the payee. Merely accepting cash payments increases the difficulty of tracking from whom the payments were made and for which payment account. Cash payments may also cause disputes if the records do not match the cash payment made.

SUMMARY OF THE INVENTION

The broad embodiments of the present invention are local payment collection and information management apparatuses comprising one or more means of storing information; one or more means of receiving information from a user; one or more means of displaying information to a user; one or more means for collecting payment from a user; one or more means for storing payments; and one or more means of a retrieving payments; whereby a user enters control information into the information-receiving means either to retrieve additional information from the information-displaying means or to make a payment by supplying the payment to the payment-collecting means, wherein the payment is then stored using the payment-storing means until the payment is retrieved by the payee using the payment-retrieving means.

The more preferred embodiments of the present invention are local payment collection and information management apparatuses comprising a secure outer cover, one or more user interfaces, a means of receiving payments, a means of scanning or imaging payments, a secure lock box for storing payments, and a system for retaining and retrieving information. The outer cover secures the interior modules and comprises a top panel, one or more display panels, a front panel, a plurality of side panels, a rear panel, and a base, which may be fixed in place. The inside of the outer cover may be accessed through an access door in the out cover which may be securely locked. A plurality of openings in the outer cover allow for interior modules to be extended to the exterior. The user interface allows users to enter and/or receive information from the apparatus and may comprise a display screen, a touchscreen, a keypad or the like, or a combination of these components. Embodiments with more than one user interface allow more than user to use and access the apparatus contemporaneously. The means of receiving payments comprises a drop slot, an opening in the outer cover, a portion of an internal module which extends through an opening in the outer cover from the interior or the like. The means of scanning or imaging payments comprises a card reader, a document reader, a scanner, a camera or the like, or a combination of these components. The secure lock box for storing payments is located within the interior of the outer cover and is accessible through the access door of the outer cover and may be separately accessed so that a payee, or their agent, may remove payments or payment documents from the lockbox. The secure lock box comprises a safe, a document stacker, a currency stacker or the like, or a combination of these components. The system for retaining and retrieving information comprises a computer, a server, a CPU, a CPU server, a CPU module, a memory device, a networked computer, a hard drive, a processor board or the like, or a combination of these components. A local payment collection and information management apparatus is a convenient and efficient means for an absent controller to provide information to users, to receive payments from payees without utilizing intermediaries and to gather data for management or accounting purposes. For example, a landlord could use a local payment collection and information management to collect rent when the landlord was not present, or provide information to users concerning the rental property, such as available units, amenities, pricing options, restrictions, or the like. In the landlord example, a local payment collection and information management would basically supply substantially all of the services that a property manager would provide. A local payment collection and information management apparatus is placed in service at or near the controller's business.

In other preferred embodiments, a local payment collection and information management apparatuses is mounted within a wall to provide more security for the apparatus by reducing the area of apparatus which is exposed and to provide more security for controllers, or their agents, who remove payments and/or payment documents from the apparatus.

In other preferred embodiments, a local payment collection and information management apparatus is provided with a security camera and a means of storing video of users using the apparatus.

In the most preferred embodiments, a local payment collection and information management apparatus comprises an outer cover, a screen module, a keypad, a CPU module, a document reader, a document stacker, a currency/card reader, a currency stacker, a thermal printer, a printer paper assembly, and a video module. The outer cover comprises a front panel, one or more display panels, a top panel, a right side panel, a left side panel, a base and a rear panel with an access door, which may be locked and secured. The base comprises a bottom panel and a plurality of footings, which extend into the slab on which a local payment collection and information management apparatus is mounted and which securely and firmly affix the apparatus in place. The screen module extends through a screen opening in the display panel and comprises a touchscreen, which allows information to be displayed to users and also allows users to enter information. The keypad extends through a keypad opening in the display panel and allows users to enter information. The CPU module is mounted within the outer cover and comprises one or more processors, memory for storing data and software for controlling the actions of the apparatus and for coordinating the various modules. The memory of the CPU module includes a database for storing data relevant to information-providing services of the apparatus and data relevant to processing a payment. Additionally, the CPU module may connect to a network in order to enable a controller to access and view data stored in the memory and use that data for management purposes. The document reader may receive documents through a document opening in the front panel. The document reader scans the document which is received and stores one or more images of the document in the database. The document stacker is a secure lockbox within the outer cover which receives documents from the document reader and stores the documents until they are retrieved at a later time by a controller. The currency/card reader extends through the currency/card opening in the front panel and may receive and scan currency bills and store one or more images of the currency bills in the database. The currency/card reader may also scan debit cards, credit cards or the like and store one or more images of the cards in the database. The currency/card reader may connect to a credit/debit card processing service facilitating standard payments or electronic funds transfers. Additionally, the currency/card reader may accept identification cards. The currency stacker is a secure lockbox within the outer cover which receives currency from the currency/card reader and stores the currency until they are retrieved at a later time by a controller. The thermal printer issues paper records through the record opening in the display panel, and the printer paper assembly supplies paper for the thermal printer. The video module comprises a camera and video recorder and records video of the users the apparatus through the video opening, which is stored in the video recorder.

Another preferred embodiment of the present invention is a method of using a local payment collection and information management apparatus. A payer may initiate a payment by entering payment-identifying information into the keypad or touchscreen screen module or by inserting a payment-identification card into the currency/card reader. Next, the payer selects the type of payment to be made. For submitting the payment with a credit card, debit card or the like, the payer inserts the card into the currency/card reader and enters the amount of the payment, which is stored in the database. The currency/card reader scans and stores one or more images of the card in the database and interacts with the banking system to process the payment and stores the payment information in the database. The payer then retrieves the card. For submitting the payment with a check, cashier's check, money order or the like, the payer enters the amount of the payment by using the keypad or touchscreen, and inserts the document into the document reader. The amount of the payment is stored in the database. The document is scanned, one or more images are stored in the database and the document is stored in the document stacker. For submitting the payment with cash, the payer enters the amount of the payment by using the keypad or touchscreen, and inserts the cash into the currency/card reader. The amount of the payment is stored in the database. The cash is scanned, one or more images of each bill are stored in the database and the cash is stored in the currency stacker. To complete the payment process, a paper printout of the electronic record of payment is generated on printer paper by the thermal printer, which may include images of the payment, so that the payer may retain a record of the payment. Alternatively, a user may retrieve information from a local payment collection and information management apparatus by selecting information services using the keypad or touchscreen. A menu may offer the user a choice of available information. A user may obtain a hard copy of the information provided by using the keypad or touchscreen to select an option to print. The thermal printer then prints the record on printer paper for retrieval by the user.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the preferred embodiments of a local payment collection and information management apparatus which is mounted in isolation and a local payment collection and information management apparatus which is mounted in a wall. Additionally, a method of collecting payment and managing the same is demonstrated. These embodiments are not intended to limit the scope of the present invention.

Figure 1:
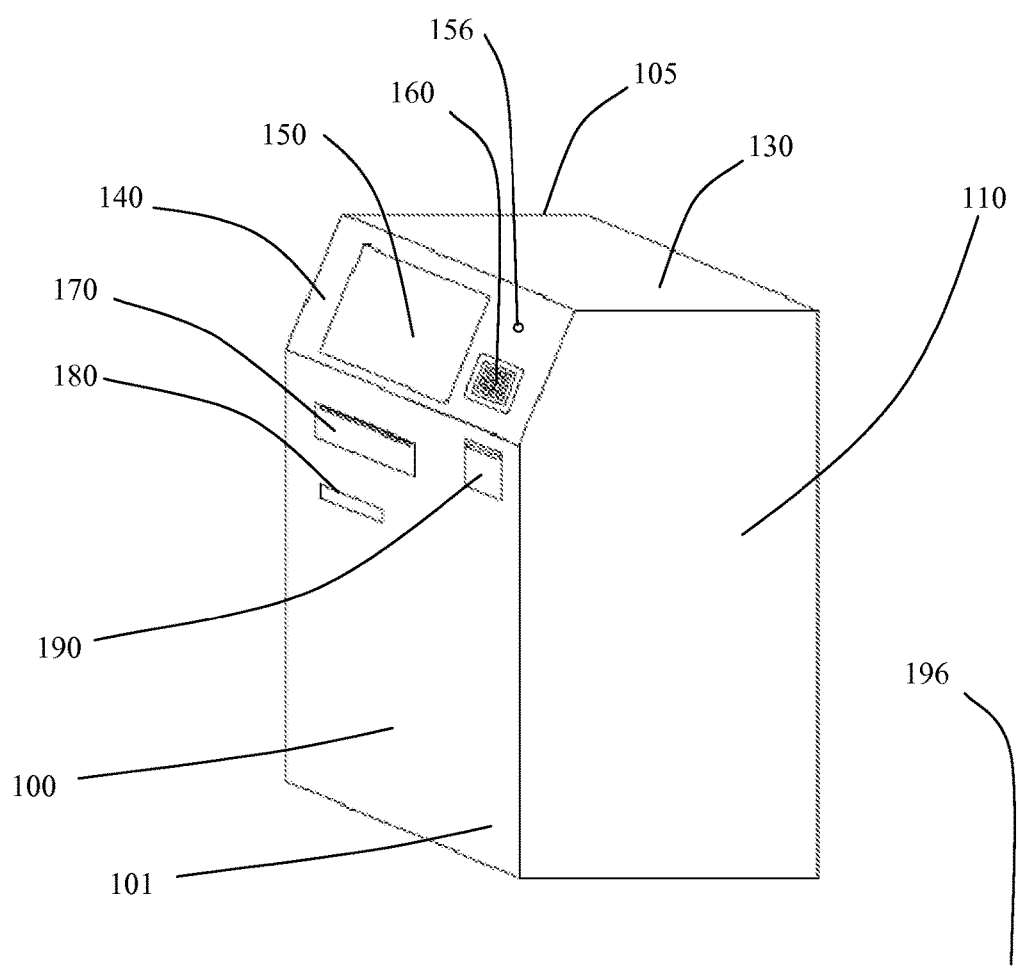
FIG. 1 is a perspective view of an apparatus of the present invention.
Figure 2:
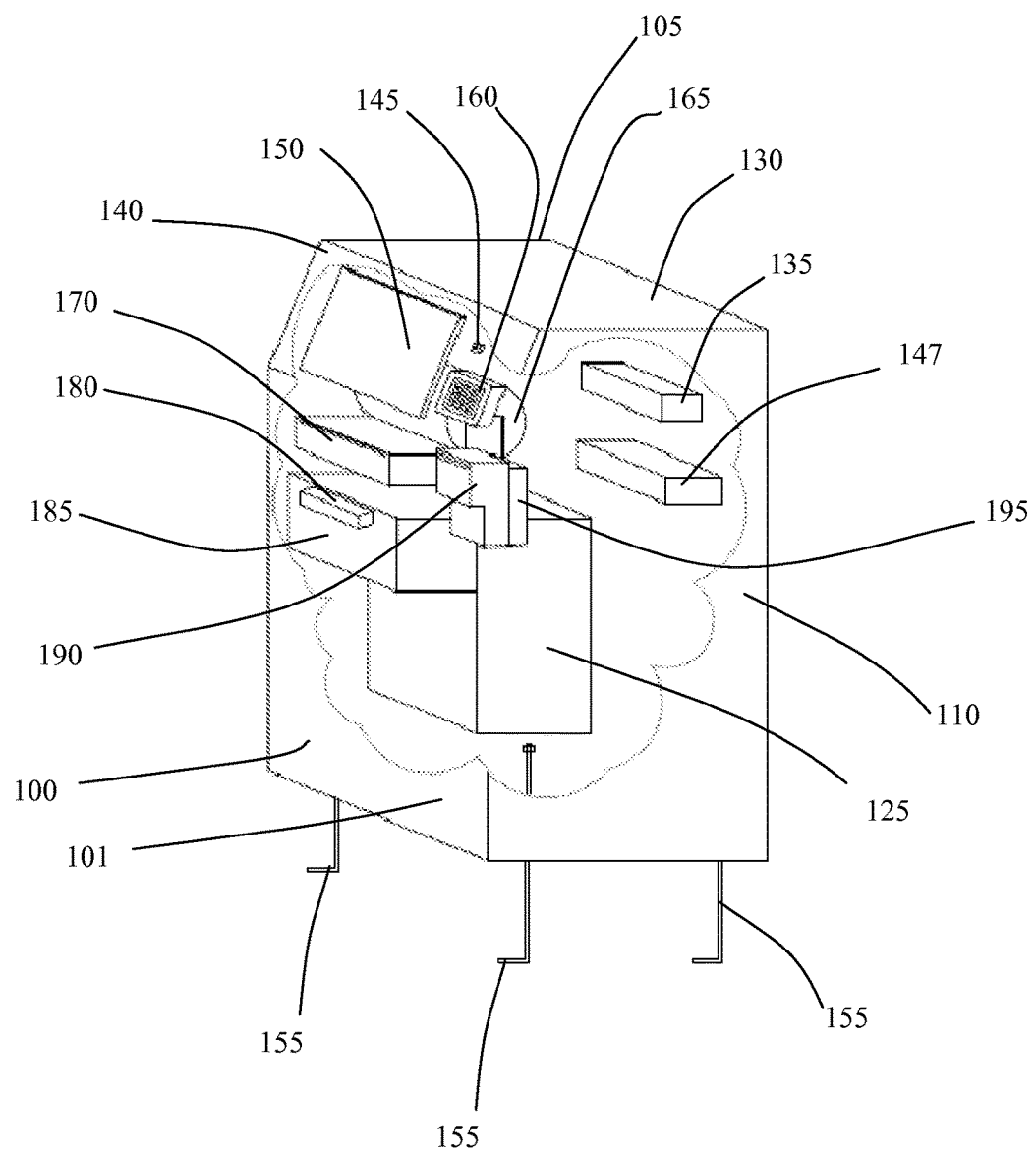
FIG. 2 is a sectional perspective view of an apparatus of FIG. 1.
Figure 3:
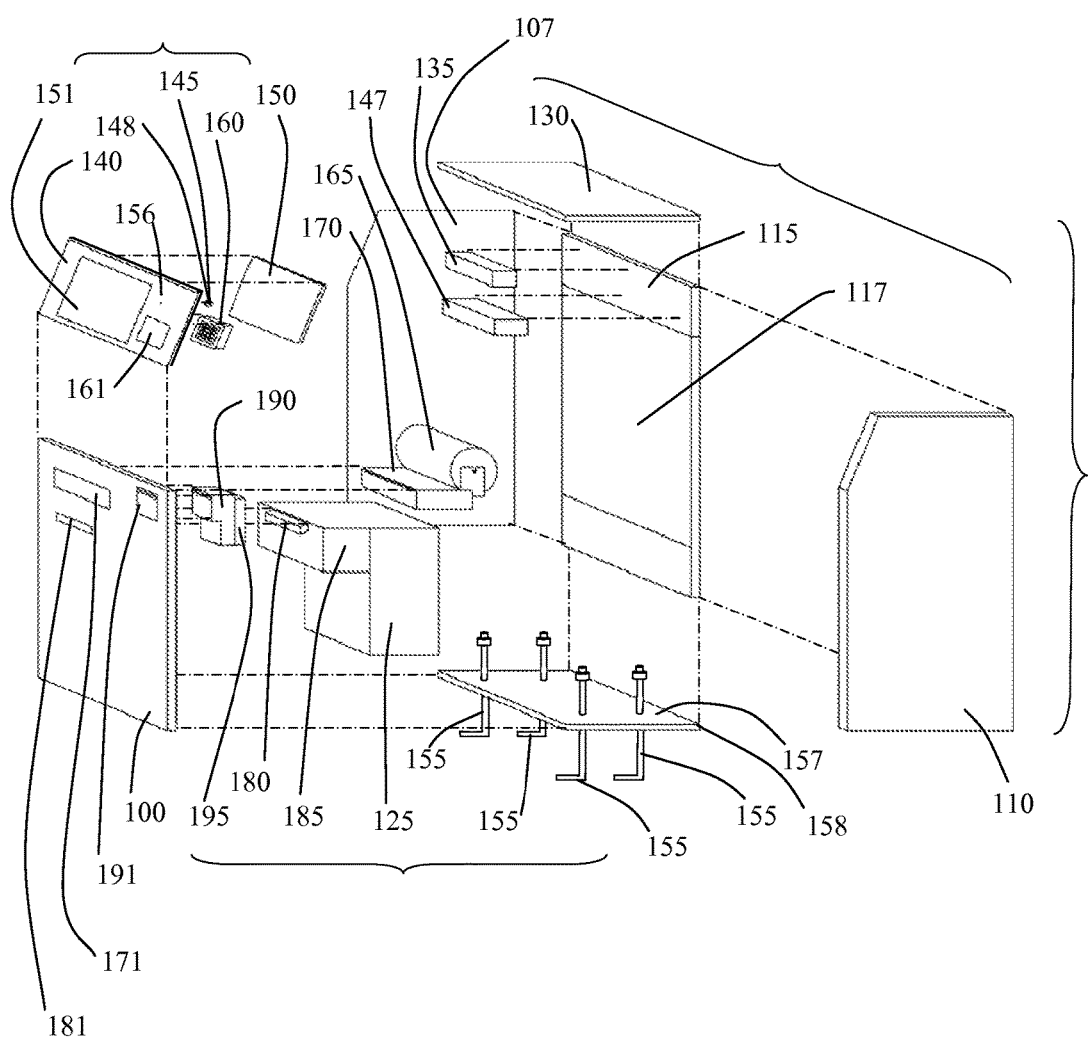
FIG. 3 is an exploded view of an apparatus of FIG. 1.
Figure 4:
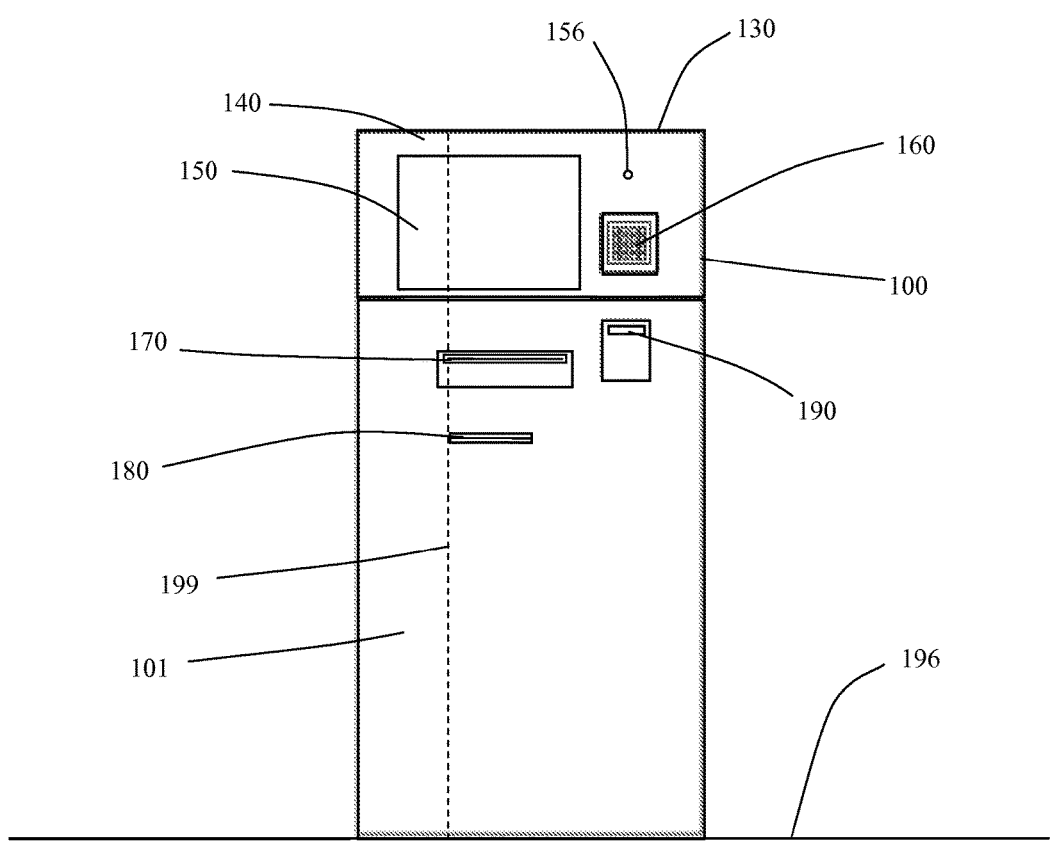
FIG. 4 is a front view of an apparatus of FIG. 1 showing the section line for FIG. 5.
Figure 5:
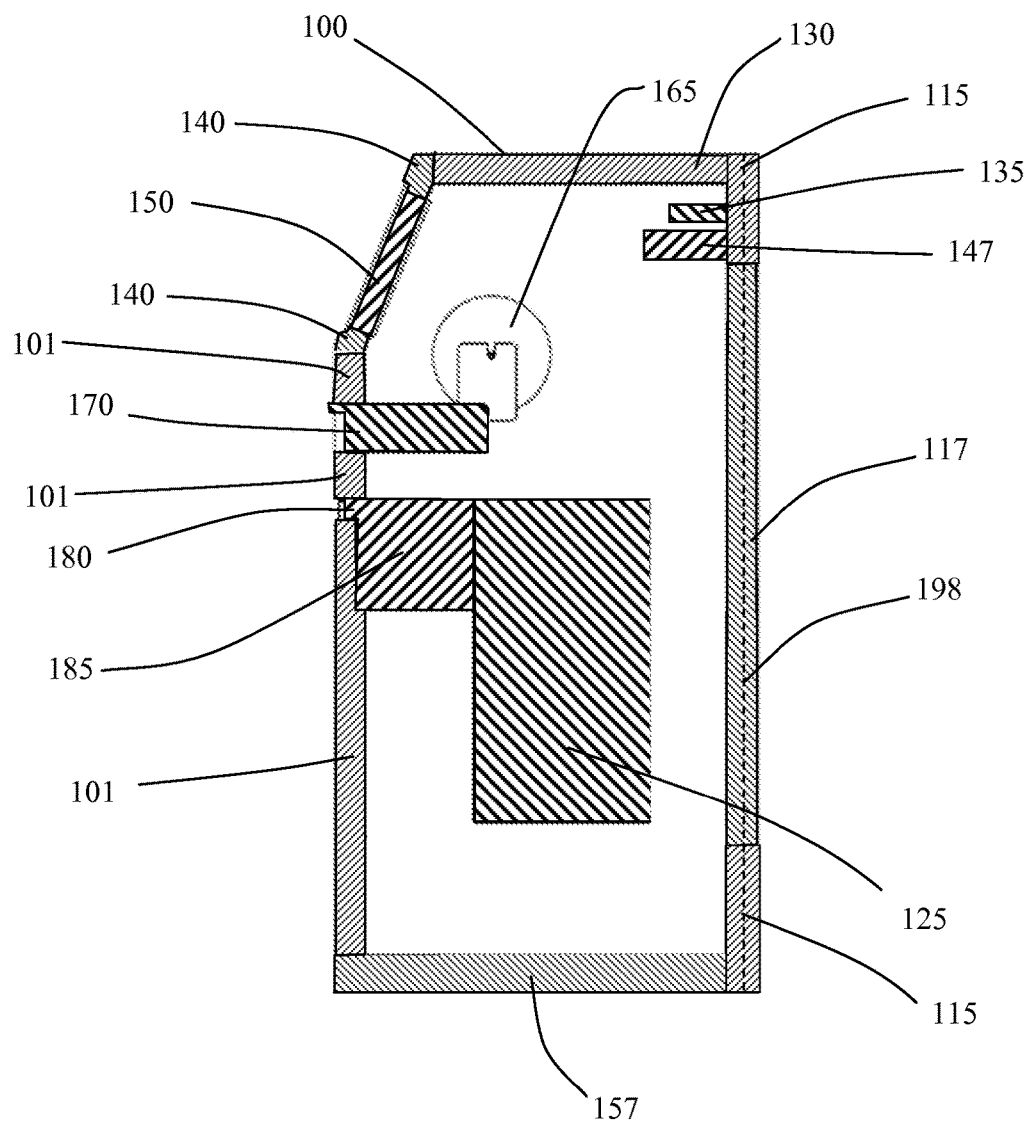
FIG. 5 is a sectional side view of an apparatus of FIG. 1.
Figure 6:
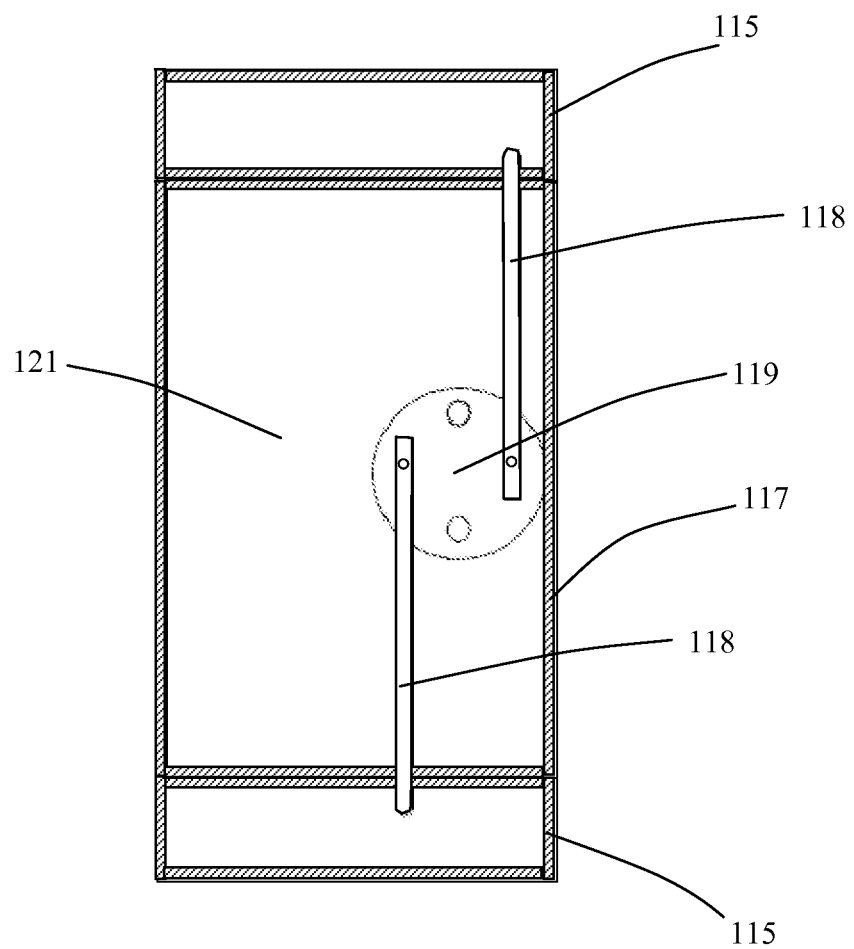
FIG. 6 is a sectional view of a door of an apparatus of FIG. 1.

Referring now to the most preferred embodiment of the invention in more detail, in FIG. 1, FIG. 2, FIG. 3, FIG. 4, FIG. 5 and FIG. 6, a local payment collection and information management apparatus 100 is illustrated. FIG. 1 shows a perspective view of a local payment collection and information management apparatus 100 installed on a slab 196. FIG. 2 illustrates a sectional perspective view a local payment collection and information management apparatus 100 which shows the internal modules of the apparatus. FIG. 3 depicts an exploded view of a local payment collection and information management apparatus 100. FIG. 4 illustrates a front view of a local payment collection and information management apparatus 100 and shows the section line 199 for FIG. 5. FIG. 5 depicts a sectional side view of a local payment collection and information management apparatus 100 which illustrates an arrangement of interior modules and shows the section line 198 for FIG. 6. FIG. 6 illustrated the interior of a door 117 of a local payment collection and information management apparatus 100 and shows a version of a locking mechanism. A local payment collection and information management apparatus 100 comprises an outer cover 105, a base 158, a screen module 150, a keypad 160, a CPU module 147, a document reader 185, a document stacker 125, a currency/card reader 190, a currency stacker 195, a thermal printer 170, a printer paper assembly 165, and a video module 145.

In further detail, still referring to the invention of FIG. 1, FIG. 2, FIG. 3, FIG. 4, FIG. 5 and FIG. 6, the outer cover 105 comprises a front panel 101, a display panel 140, a top panel 130, a right side panel 110, a left side panel 107, and a rear panel 115 with an access door 117, which may be locked and secured. The base 158 comprises a bottom panel 157 and a plurality of footings 155, which extend into the slab 196 on which a local payment collection and information management apparatus 100 is mounted and which securely and firmly affix the apparatus in place. The screen module 150 extends through a screen opening 151 in the display panel 140 and may be a video monitor, a touchscreen or the like. The screen module allows information to be displayed to users of a local payment collection and information management apparatus 100. An embodiment which uses a touchscreen as the screen module 150 allows information to be displayed to users of that embodiment of a local payment collection and information management apparatus 100 and also allows users to enter information. The keypad 160 extends through a keypad opening 161 in the display panel 140 and allows users to enter information. The CPU module 147 is mounted within the outer cover 105 and comprises one or more processors, memory for storing data and software for controlling the actions of a local payment collection and information management apparatus 100 and for coordinating the various modules. The memory of the CPU module 147 includes a database for storing data relevant to information-providing services of a local payment collection and information management apparatus 100, such as pictures, video, text, brochures, catalogues or the like, and data relevant to processing a payment, such as payment identification information, amount due, payment type, amount paid, images of the payment, date, time or the like. Additionally, the CPU module 147 may connect to a network, the internet or the like, in order to enable a payee who controls a local payment collection and information management apparatus 100 to access and view data stored in the memory of the CPU module 147 and use that data for management purposes, reporting purposes, billing purposes, accounting purposes or the like. The document reader 185 may receive documents, such as checks, cashier's checks, money orders, or the like, through a document opening 180 which is in the front panel 101. The document reader 185 scans the document which is received through the document opening 180 and stores one or more images of the document in the database in the memory of the CPU module 147. The document stacker 125 is a secure lockbox within the outer cover 105 which receives documents from the document reader 185 and stores the documents until they are retrieved at a later time by a payee who operates and controls a local payment collection and information management apparatus 100, or their agent. The currency/card reader 190 extends through the currency/card opening 191 in the front panel 101. The currency/card reader 190 may scan currency bills and store one or more images of the currency bills in the database in the memory of the CPU module 147. The currency/card reader 190 may also scan debit cards, credit cards or the like and store one or more images of the cards in the database in the memory of the CPU module 147. The currency/card reader 190 may connect to a credit/debit card processing service, network or the like, for facilitating standard payments or electronic funds transfers. Additionally, the currency/card reader 190 may accept identification cards which may identify a payer, an account to be paid, or a payment to be made. The currency stacker 195 is a secure lockbox within the outer cover 105 which receives currency from the currency/card reader 190 and stores the currency until they are retrieved at a later time by a payee who operates and controls a local payment collection and information management apparatus 100, or their agent. The thermal printer 170 issues paper records, such as receipts, printouts of payment images, records of payments, informational documents, marketing documents, brochures, catalogues, pamphlets or the like, through the record opening 171 in the display panel 140. The printer paper assembly 165 supplies paper for the thermal printer 170. The video module 145 comprises a camera 148 and video recorder 135 and records video of the users of a local payment collection and information management apparatus 100 through the video opening 156. The recorded video data is stored in the video recorder 135.

In further detail, still referring to the invention of FIG. 1, FIG. 2, FIG. 3, FIG. 4, FIG. 5 and FIG. 6, a payer may initiate a payment by entering payment-identifying information into the keypad 160 or touchscreen screen module 150 or the like or by inserting a payment-identification card into the currency/card reader 190. Next, the payer selects the type of payment to be made, such as cash, credit card, debit card, check, cashier's check, money order or the like, by using the keypad 160 or touchscreen screen module 150 or the like. For submitting the payment with a credit card, debit card or the like, the payer inserts the card into the currency/card reader 190 and enters the amount of the payment, which is stored in the database within the CPU module 147. The currency/card reader 190 scans and stores one or more images of the card in the database within the CPU module 147 and interacts with the banking system to process the payment and stores the payment information in the database within the CPU module 147. The payer then retrieves the card. For submitting the payment with a check, cashier's check, money order or the like, the payer enters the amount of the payment by using the keypad 160, touchscreen screen module 150 or the like, and inserts the document into the document reader 185. The amount of the payment is stored in the database within the CPU module 147. The document is scanned, one or more images are stored in the database within the CPU module 147 and the document is stored in the document stacker 125. For submitting the payment with cash, the payer enters the amount of the payment by using the keypad 160, touchscreen screen module 150 or the like, and inserts the cash into the currency/card reader 190. The amount of the payment is stored in the database within the CPU module 147. The cash is scanned, one or more images of each bill are stored in the database within the CPU module 147 and the cash is stored in the currency stacker 195. To complete the payment process, a paper printout of the electronic record of payment is generated on printer paper by the thermal printer 170, which may include images of the payment, so that the payer may retain a record of the payment. Alternatively, a user may retrieve information from a local payment collection and information management apparatus 100 by selecting information services using the keypad 160, touchscreen screen module 150 or the like. A menu may offer the user a choice of available information, which may include pricing information, available products or services, marketing brochures, catalogues, images, directions, instructions, advertisements, pamphlets, flyers, payment records, statistics or the like. A user may obtain a hard copy of the information provided by using the keypad 160, touchscreen screen module 150 or the like, to select an option to print. The thermal printer 170 then prints the record on printer paper for retrieval by the user.

The construction details of the invention as shown in FIG. 1, FIG. 2, FIG. 3, FIG. 4, FIG. 5 and FIG. 6, are that a local payment collection and information management apparatus 100 comprises an outer cover 105, a base 158, a screen module 150, a keypad 160, a CPU module 147, a document reader 185, a document stacker 125, a currency/card reader 190, a currency stacker 195, a thermal printer 170, a printer paper assembly 165, and a video module 145. The outer cover 105 comprises a front panel 101, a display panel 140, a top panel 130, a right side panel 110, a left side panel 107, and a rear panel 115 with an access door 117, which may be locked and secured. The front panel 101, display panel 140, top panel 130, right side panel 110, left side panel 107, and rear panel 115 are comprised of metal, sheet steel, reinforced steel, aluminum, composite materials or the like, and is sufficiently strong to provide security for valuables contained within a local payment collection and information management apparatus 100, such as cash, checks, credit card information or the like. Each panel may have a plurality of openings, such as the screen opening 151, the keypad opening 161, the document opening 180, the currency/card opening 191 or the like, to facilitate the extension of interior modules from the interior to the exterior of the outer cover 105. The door 117 is comprised of a door panel 121 and a lock 119. The door panel is comprised of metal, sheet steel, reinforced steel, aluminum, composite materials or the like, and is sufficiently strong to provide security for valuables contained within a local payment collection and information management apparatus 100. The lock 119 is comprised of metal, steel, reinforced steel, aluminum, composite materials or the like and may be comprised of a plurality of locking arms 118 which extend from the interior of the door 117 into the interior of the rear panel 115 when locked, as illustrated in FIG. 6. The base 158 comprises a bottom panel 157 and a plurality of footings 155. The bottom panel 157 is comprised of metal, sheet steel, reinforced steel, aluminum, concrete, reinforced concrete, composite materials or the like. The footings 155 are comprised of metal, steel, steel rebar, composite material or the like, and are firmly and securely attached to the bottom panel using bolts, welding or the like. The footings are L-shaped and extend into the slab on which a local payment collection and information management apparatus 100 is mounted and firmly and securely hold the apparatus in place and preventing its removal. The screen module 150 extends through a screen opening 151 in the display panel 140 and may comprise a pre-existing video monitor, a touchscreen or the like. The keypad 160 extends through a keypad opening 161 in the display panel 140 and comprises a pre-existing keypad module or the like. The CPU module 147 is mounted within the outer cover 105 and comprises pre-existing components comprising one or more processors, memory for storing data and software for controlling the actions of a local payment collection and information management apparatus 100 and for coordinating the various modules. The CPU module 147 may connect to a network, the internet or the like, using a pre-existing network card or the like, in order to enable a payee who controls a local payment collection and information management apparatus 100 to access and view data stored in the memory of the CPU module 147. The document reader 185 may receive documents, such as checks, cashier's checks, money orders, or the like, through a document opening 180 which is in the front panel 101. The document reader 185 is comprised of pre-existing document scanning hardware, or the like. The document stacker 125 is a secure lockbox within the outer cover 105 which receives documents from the document reader 185 and stores the documents until they are retrieved and is comprised of a pre-existing document-stacking hardware or the like. The currency/card reader 190 extends through the currency/card opening 191 in the front panel 101. The currency/card reader 190 may scan currency bills, identification cards, debit cards, credit cards or the like, and store one or more images of the scans in the database in the memory of the CPU module 147. The currency/card reader 190 may connect to a credit/debit card processing service, network or the like, for facilitating standard payments or electronic funds transfers and is comprised of pre-existing currency/card reading hardware or the like. The currency stacker 195 is a secure lockbox within the outer cover 105 which receives currency from the currency/card reader 190 and stores the currency until retrieved and is comprised of a pre-existing currency stacking hardware or the like. The thermal printer 170 issues paper records, such as receipts, printouts of payment images, records of payments, informational documents, marketing documents, brochures, catalogues, pamphlets or the like, through the record opening 171 in the display panel 140, and is comprised of pre-existing thermal printing hardware or the like. The printer paper assembly 165 supplies paper for the thermal printer 170 and is comprised of pre-existing printer paper assembly hardware or the like. The video module 145 comprises a camera 148 and video recorder 135 and records video of the users of a local payment collection and information management apparatus 100 through the video opening 156. The recorded video data is stored in the video recorder 135. The camera 148 is comprised of pre-existing camera hardware or the like. The video recorder 135 is comprised of pre-existing video recording hardware or the like.

Figure 7:
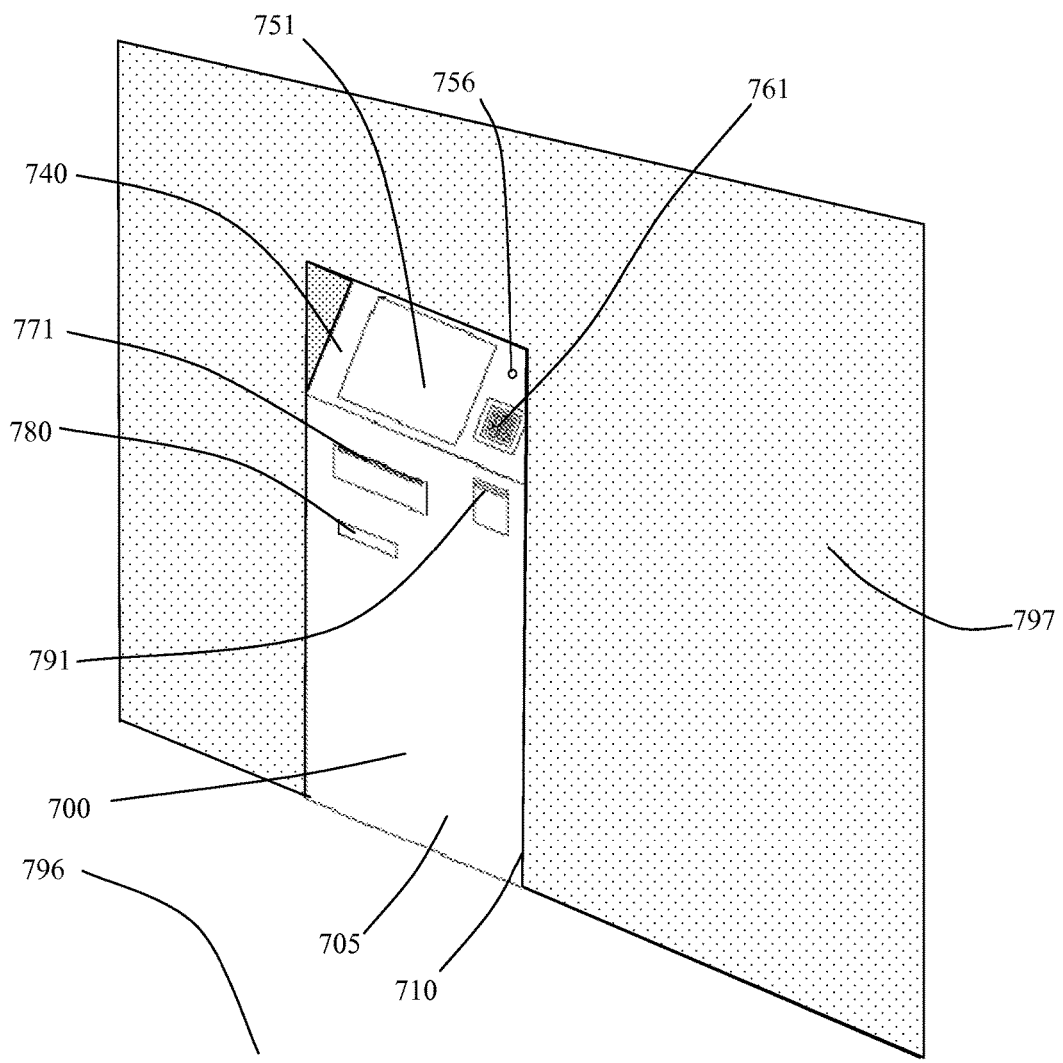
FIG. 7 is a perspective view of an apparatus of the present invention mounted in a wall.
Figure 8:
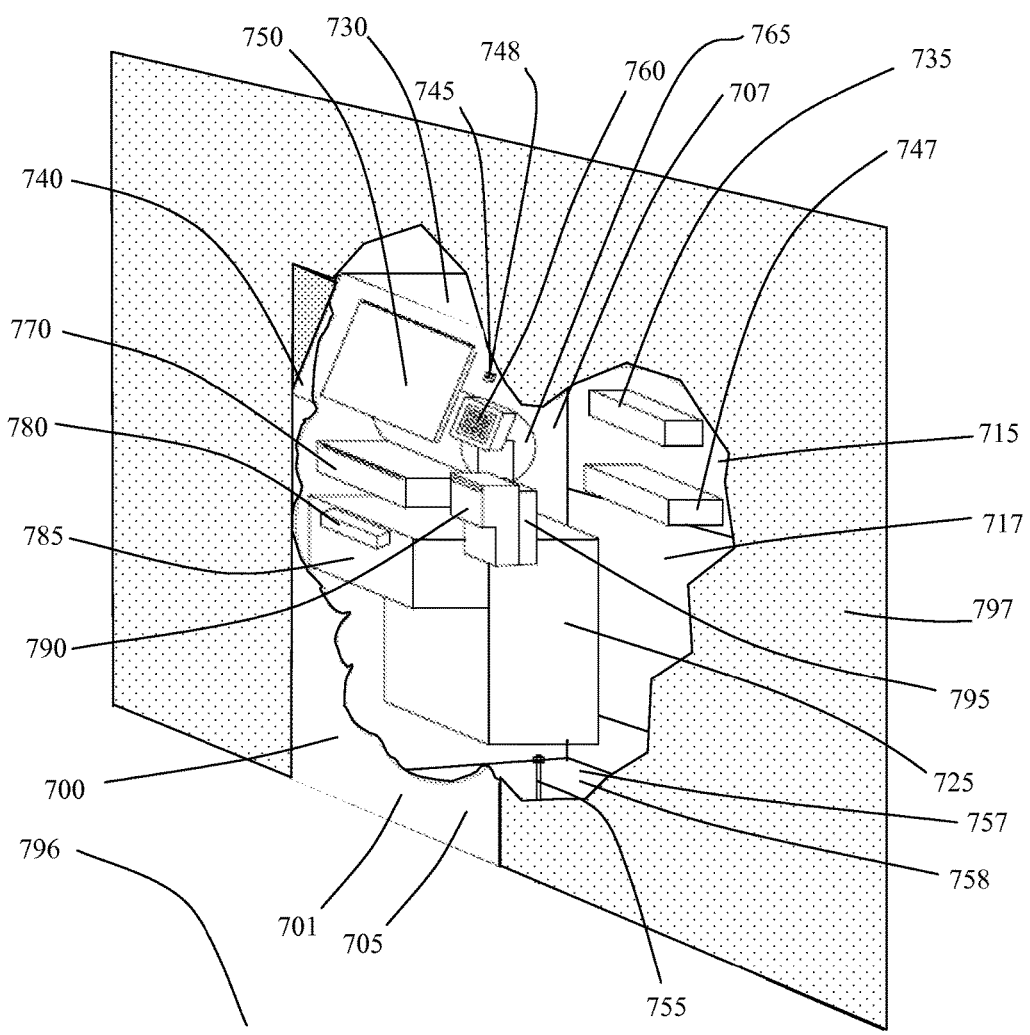
FIG. 8 is a sectional perspective view of an apparatus of FIG. 7.
Figure 9:
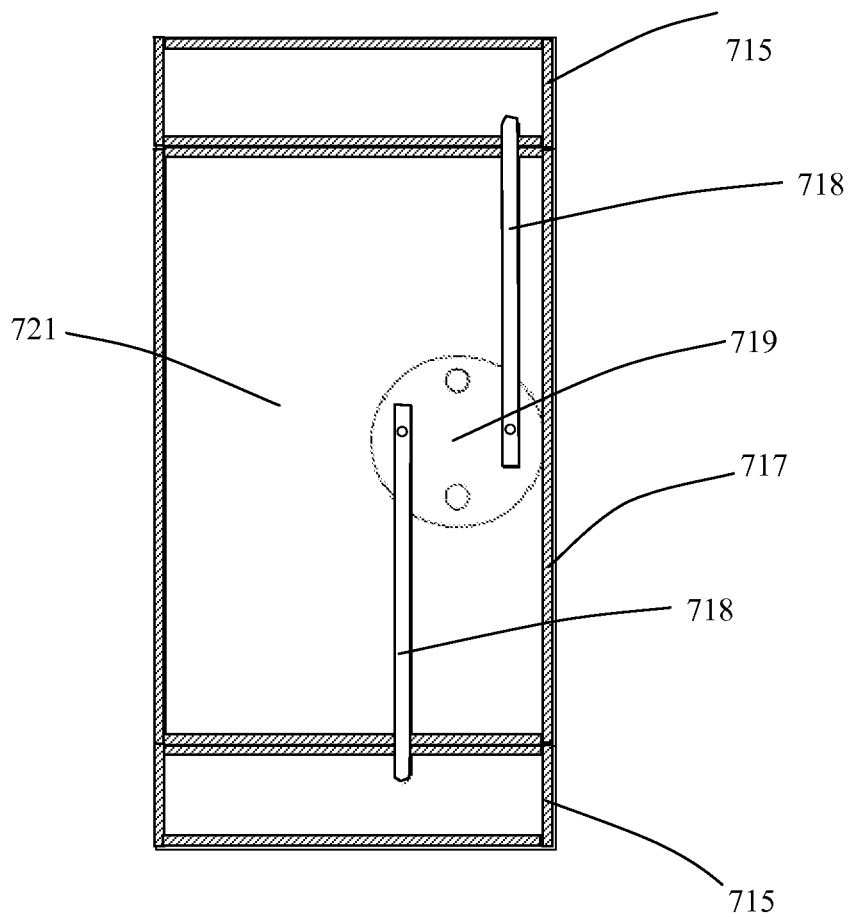
FIG. 9 is a sectional view of a door of an apparatus of FIG. 7.

Referring now to another embodiment of the invention, in FIG. 7, FIG. 8 and FIG. 9, a local payment collection and information management apparatus 700 mounted in a wall 797 is illustrated. FIG. 7 shows a perspective view of a local payment collection and information management apparatus 700 mounted in a wall 797 and installed on a slab 796. FIG. 8 illustrates a sectional perspective view a local payment collection and information management apparatus 700 mounted in a wall 797 and shows the internal modules of the apparatus. FIG. 9 illustrated the interior of a door 117 of a local payment collection and information management apparatus 100 and shows a version of a locking mechanism. A local payment collection and information management apparatus 700 comprises an outer cover 705, a base 758, a screen module 750, a keypad 760, a CPU module 747, a document reader 785, a document stacker 725, a currency/card reader 790, a currency stacker 795, a thermal printer 770, a printer paper assembly 765, and a video module 745.

In further detail, still referring to the invention of FIG. 7, FIG. 8 and FIG. 9, the outer cover 705 comprises a front panel 701, a display panel 740, a top panel 730, a right side panel 710, a left side panel 707, and a rear panel 715 with an access door 717, which may be locked and secured. The base 758 comprises a bottom panel 757 and a plurality of footings 755, which extend into the slab 796 on which a local payment collection and information management apparatus 700 is mounted and which securely and firmly affix the apparatus in place. The screen module 750 extends through a screen opening 751 in the display panel 740 and may be a video monitor, a touchscreen or the like. The screen module allows information to be displayed to users of a local payment collection and information management apparatus 700. An embodiment which uses a touchscreen as the screen module 750 allows information to be displayed to users of that embodiment of a local payment collection and information management apparatus 700 and also allows users to enter information. The keypad 760 extends through a keypad opening 761 in the display panel 740 and allows users to enter information. The CPU module 747 is mounted within the outer cover 705 and comprises one or more processors, memory for storing data and software for controlling the actions of a local payment collection and information management apparatus 700 and for coordinating the various modules. The memory of the CPU module 747 includes a database for storing data relevant to information-providing services of a local payment collection and information management apparatus 700, such as pictures, video, text, brochures, catalogues or the like, and data relevant to processing a payment, such as payment identification information, amount due, payment type, amount paid, images of the payment, date, time or the like. Additionally, the CPU module 747 may connect to a network, the internet or the like, in order to enable a payee who controls a local payment collection and information management apparatus 700 to access and view data stored in the memory of the CPU module 747 and use that data for management purposes, reporting purposes, billing purposes, accounting purposes or the like. The document reader 785 may receive documents, such as checks, cashier's checks, money orders, or the like, through a document opening 780 which is in the front panel 701. The document reader 785 scans the document which is received through the document opening 780 and stores one or more images of the document in the database in the memory of the CPU module 747. The document stacker 725 is a secure lockbox within the outer cover 705 which receives documents from the document reader 785 and stores the documents until they are retrieved at a later time by a payee who operates and controls a local payment collection and information management apparatus 700, or their agent. The currency/card reader 790 extends through the currency/card opening 791 in the front panel 701. The currency/card reader 790 may scan currency bills and store one or more images of the currency bills in the database in the memory of the CPU module 747. The currency/card reader 790 may also scan debit cards, credit cards or the like and store one or more images of the cards in the database in the memory of the CPU module 747. The currency/card reader 790 may connect to a credit/debit card processing service, network or the like, for facilitating standard payments or electronic funds transfers. Additionally, the currency/card reader 790 may accept identification cards which may identify a payer, an account to be paid or a payment to be made. The currency stacker 795 is a secure lockbox within the outer cover 705 which receives currency from the currency/card reader 790 and stores the currency until they are retrieved at a later time by a payee who operates and controls a local payment collection and information management apparatus 700, or their agent. The thermal printer 770 issues paper records, such as receipts, printouts of payment images, records of payments, informational documents, marketing documents, brochures, catalogues, pamphlets or the like, through the record opening 771 in the display panel 740. The printer paper assembly 765 supplies paper for the thermal printer 770. The video module 745 comprises a camera 748 and video recorder 735 and records video of the users of a local payment collection and information management apparatus 700 through the video opening 756. The recorded video data is stored in the video recorder 735.

In further detail, still referring to the invention of FIG. 7, FIG. 8 and FIG. 9, a payer may initiate a payment by entering payment-identifying information into the keypad 760 or touchscreen screen module 750 or the like or by inserting a payment-identification card into the currency/card reader 790. Next, the payer selects the type of payment to be made, such as cash, credit card, debit card, check, cashier's check, money order or the like, by using the keypad 760 or touchscreen screen module 750 or the like. For submitting the payment with a credit card, debit card or the like, the payer inserts the card into the currency/card reader 790 and enters the amount of the payment, which is stored in the database within the CPU module 747. The currency/card reader 790 scans and stores one or more images of the card in the database within the CPU module 747 and interacts with the banking system to process the payment and stores the payment information in the database within the CPU module 747. The payer then retrieves the card. For submitting the payment with a check, cashier's check, money order or the like, the payer enters the amount of the payment by using the keypad 760, touchscreen screen module 750 or the like, and inserts the document into the document reader 785. The amount of the payment is stored in the database within the CPU module 747. The document is scanned, one or more images are stored in the database within the CPU module 747 and the document is stored in the document stacker 725. For submitting the payment with cash, the payer enters the amount of the payment by using the keypad 760, touchscreen screen module 750 or the like, and inserts the cash into the currency/card reader 790. The amount of the payment is stored in the database within the CPU module 747. The cash is scanned, one or more images of each bill are stored in the database within the CPU module 747 and the cash is stored in the currency stacker 795. To complete the payment process, a paper printout of the electronic record of payment is generated on printer paper by the thermal printer 770, which may include images of the payment, so that the payer may retain a record of the payment. Alternatively, a user may retrieve information from a local payment collection and information management apparatus 700 by selecting information services using the keypad 760, touchscreen screen module 750 or the like. A menu may offer the user a choice of available information, which may include pricing information, available products or services, marketing brochures, catalogues, images, directions, instructions, advertisements, pamphlets, flyers, payment records, statistics or the like. A user may obtain a hard copy of the information provided by using the keypad 760, touchscreen screen module 750 or the like, to select an option to print. The thermal printer 770 then prints the record on printer paper for retrieval by the user.

The construction details of the invention as shown in FIG. 7, FIG. 8 and FIG. 9, are that a local payment collection and information management apparatus 700 comprises an outer cover 705, a base 758, a screen module 750, a keypad 760, a CPU module 747, a document reader 785, a document stacker 725, a currency/card reader 790, a currency stacker 795, a thermal printer 770, a printer paper assembly 765, and a video module 745. The outer cover 705 comprises a front panel 701, a display panel 740, a top panel 730, a right side panel 710, a left side panel 707, and a rear panel 715 with an access door 717, which may be locked and secured. The front panel 701, display panel 740, top panel 730, right side panel 710, left side panel 707, and rear panel 715 are comprised of metal, sheet steel, reinforced steel, aluminum, composite materials or the like, and is sufficiently strong to provide security for valuables contained within a local payment collection and information management apparatus 700, such as cash, checks, credit card information or the like. Each panel may have a plurality of openings, such as the screen opening 751, the keypad opening 761, the document opening 780, the currency/card opening 791 or the like, to facilitate the extension of interior modules from the interior to the exterior of the outer cover 705. The door 717 is comprised of a door panel 721 and a lock 719. The door panel is comprised of metal, sheet steel, reinforced steel, aluminum, composite materials or the like, and is sufficiently strong to provide security for valuables contained within a local payment collection and information management apparatus 700. The lock 719 is comprised of metal, steel, reinforced steel, aluminum, composite materials or the like and may be comprised of a plurality of locking arms 718 which extend from the interior of the door 717 into the interior of the rear panel 715 when locked, as illustrated in FIG. 9. The base 758 comprises a bottom panel 757 and a plurality of footings 755. The bottom panel 757 is comprised of metal, sheet steel, reinforced steel, aluminum, concrete, reinforced concrete, composite materials or the like. The footings 755 are comprised of metal, steel, steel rebar, composite material or the like, and are firmly and securely attached to the bottom panel using bolts, welding or the like. The footings are L-shaped and extend into the slab on which a local payment collection and information management apparatus 700 is mounted and firmly and securely hold the apparatus in place and preventing its removal. The screen module 750 extends through a screen opening 751 in the display panel 740 and may comprise a pre-existing video monitor, a touchscreen or the like. The keypad 760 extends through a keypad opening 761 in the display panel 740 and comprises a pre-existing keypad module or the like. The CPU module 747 is mounted within the outer cover 705 and comprises pre-existing components comprising one or more processors, memory for storing data and software for controlling the actions of a local payment collection and information management apparatus 700 and for coordinating the various modules. The CPU module 747 may connect to a network, the internet or the like, using a pre-existing network card or the like, in order to enable a payee who controls a local payment collection and information management apparatus 700 to access and view data stored in the memory of the CPU module 747. The document reader 785 may receive documents, such as checks, cashier's checks, money orders, or the like, through a document opening 780 which is in the front panel 701. The document reader 785 is comprised of pre-existing document scanning hardware, or the like. The document stacker 725 is a secure lockbox within the outer cover 705 which receives documents from the document reader 785 and stores the documents until they are retrieved and is comprised of a pre-existing document-stacking hardware or the like. The currency/card reader 790 extends through the currency/card opening 791 in the front panel 701. The currency/card reader 790 may scan currency bills, identification cards, debit cards, credit cards or the like, and store one or more images of the scans in the database in the memory of the CPU module 747. The currency/card reader 790 may connect to a credit/debit card processing service, network or the like, for facilitating standard payments or electronic funds transfers and is comprised of pre-existing currency/card reading hardware or the like. The currency stacker 795 is a secure lockbox within the outer cover 705 which receives currency from the currency/card reader 790 and stores the currency until retrieved and is comprised of a pre-existing currency stacking hardware or the like. The thermal printer 770 issues paper records, such as receipts, printouts of payment images, records of payments, informational documents, marketing documents, brochures, catalogues, pamphlets or the like, through the record opening 771 in the display panel 740, and is comprised of pre-existing thermal printing hardware or the like. The printer paper assembly 765 supplies paper for the thermal printer 770 and is comprised of pre-existing printer paper assembly hardware or the like. The video module 745 comprises a camera 748 and video recorder 735 and records video of the users of a local payment collection and information management apparatus 700 through the video opening 756. The recorded video data is stored in the video recorder 735. The camera 748 is comprised of pre-existing camera hardware or the like. The video recorder 735 is comprised of pre-existing video recording hardware or the like.

Figure 10:
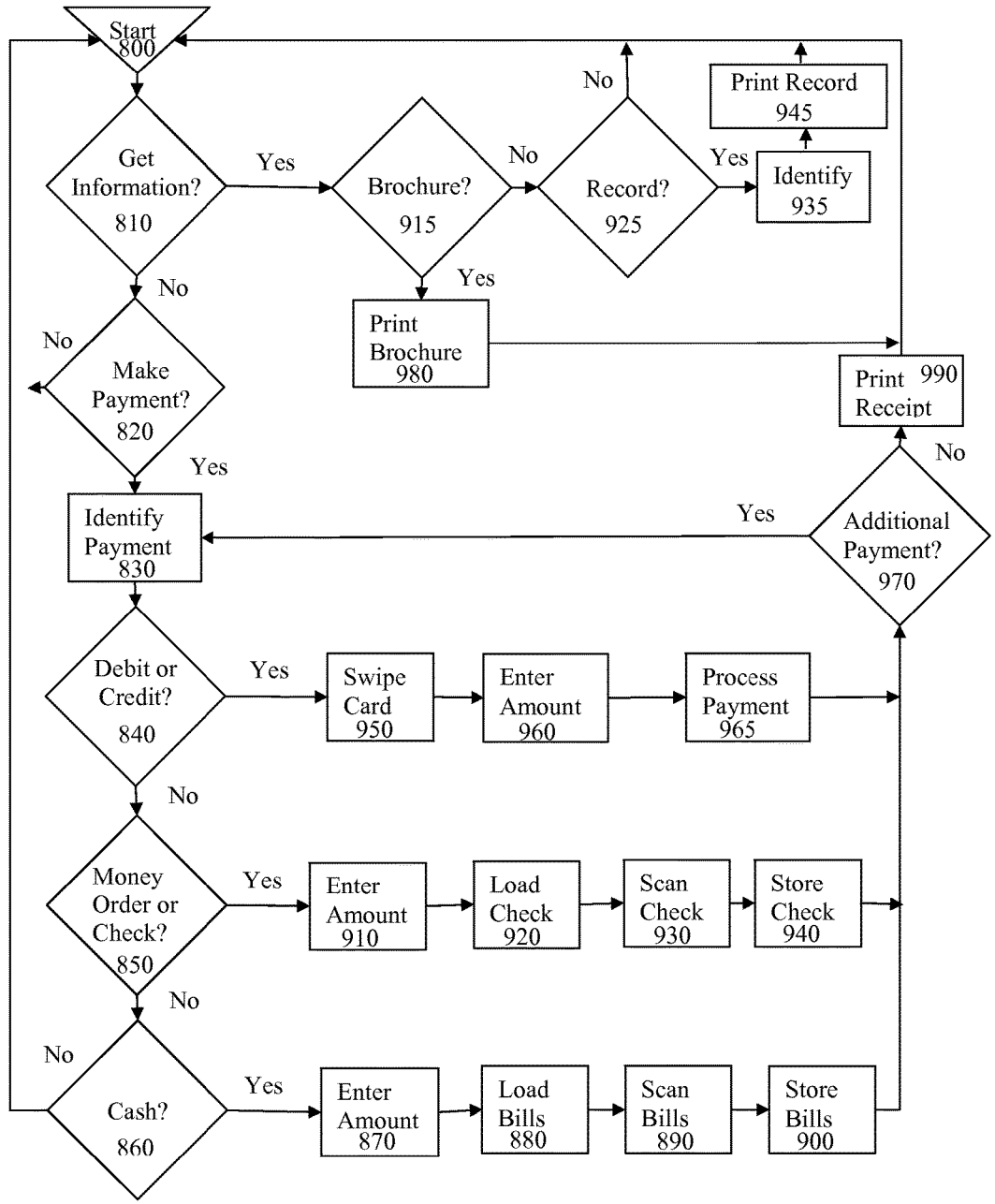
FIG. 10 is a flowchart that shows a use of an apparatus of the present invention.

Referring now to FIG. 10, a method of using the present invention is illustrated. In FIG. 10 a flowchart is shown which describes the process of using a local payment collection and information management apparatus to submit a payment to an absent payee or to retrieve information.

In further detail, still referring to the method of FIG. 10, the first step of using a local payment collection and information management apparatus is to select start 800 from the start screen displayed to a user who approaches the apparatus. Next, the user is asked if they want to get information 810. If the user chooses to get information 810, the present invention will offer a choice of available information depending on the purposes of the controller of the particular local payment collection and information management apparatus. The potential information available may include pricing information, available products or services, marketing brochures, catalogues, images, directions, instructions, advertisements, pamphlets, flyers, payment records, statistics or the like. In the embodiment described in FIG. 10, the user seeking to get information 810 is provided with a choice of a brochure 915 or not. If the user chooses a brochure 915, the brochure is printed 980 and may be retrieved by the user. The start screen is then displayed again.

If the user does not select a brochure, the user is asked if they would like to retrieve a record 925. If the user selects "no," the start screen is displayed again; however, if the user selects "yes," the user identifies the record 935 that is to be retrieved. Once identified, the record is printed out 945. The start screen is then displayed again.

If the user foregoes getting information 810, the user is asked if they want to make a payment 820. If not, the start screen is displayed again. If the user does want to make a payment, the user identifies the payment 830 to be made. Identifying the payment may include identifying the payer, identifying the account to which the payment is to be applied, a particular payment or the like. The payment may also be identified by an identification number, an identification card, an identification key or the like. The identification of the payment is stored in the database in the memory of the CPU module.

After the payment is identified, the user is asked about the type of payment to be made. First, the user is asked if they will be paying with a debit card, credit card or the like 840. If the user answers "yes," the user is prompted to swipe the user's card 950. The user then enters the amount of the payment 960. The amount of the payment and information about the card is stored in the database in the memory of the CPU module. The card reader connects to a debit or credit card network and processes the payment 965. The user is then asked whether they wish to make another payment 970. If so, the user is asked to identify the payment 830 and continue with the payment process. If the user does not wish to make another payment, a receipt of the transaction is printed 990 which included images of the card used to make the payment, the identification of the payment, the amount paid, the date and time of payment, or other information relevant to the payment transaction. The start screen is then displayed again.

If the user does not wish to pay with a debit card, credit card or the like, the user is asked if they wish to pay using a money order, check, cashier's check or the like 850. If so, the user is prompted to enter the amount of the payment 910. The amount of the payment is stored in the database in the memory of the CPU module. Next, the user is prompted to load the check document 920 into the document reader. The check document is then scanned 930 by the document reader and one or more images of the check document are stored 940 in the database in the memory of the CPU module. The check document is then stored 940 in the document stacker until retrieved by the payee, or their agent, at a later time. The user is then asked whether they wish to make another payment 970. If so, the user is asked to identify the payment 830 and continue with the payment process. If the user does not wish to make another payment, a receipt of the transaction is printed 990 which included images of the check document used to make the payment, the identification of the payment, the amount paid, the date and time of payment, or other information relevant to the payment transaction. The start screen is then displayed again.

If the user does not wish to pay with a debit card, credit card or the like, and if the user does not wish to pay with a money order, check, cashier's check or the like, the user is asked if they wish to pay using cash 860 or a cash equivalent. If so, the user is prompted to enter the amount of the payment 870. The amount of the payment is stored in the database in the memory of the CPU module. Next, the user is prompted to load the currency bills 880 into the currency reader. The currency bills are then scanned 890 by the currency reader and one or more images of the currency bills are stored in the database in the memory of the CPU module. The currency bills are then stored 900 in the currency stacker until retrieved by the payee, or their agent, at a later time. The user is then asked whether they wish to make another payment 970. If so, the user is asked to identify the payment 830 and continue with the payment process. If the user does not wish to make another payment, a receipt of the transaction is printed 990 which included images of the currency used to make the payment, the identification of the payment, the amount paid, the date and time of payment, or other information relevant to the payment transaction. The start screen is then displayed again.

If the user does not wish to pay with a debit card, credit card or the like, if the user does not wish to pay with a money order, check, cashier's check or the like, and if the user does not wish to pay using cash or a cash equivalent, the start screen is displayed again.

Figure 11:
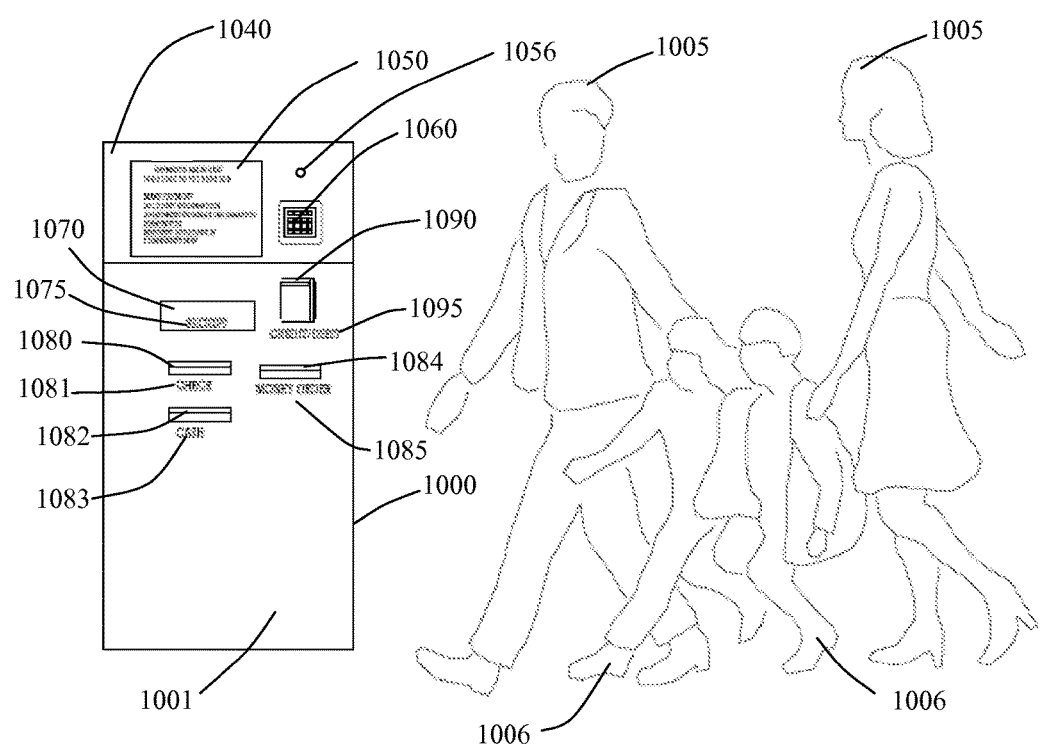
FIG. 11 is a front view of the present invention which includes labels that appear on the apparatus during use, shows a screen shot of the apparatus during use and shows users and their family.
Figure 12:
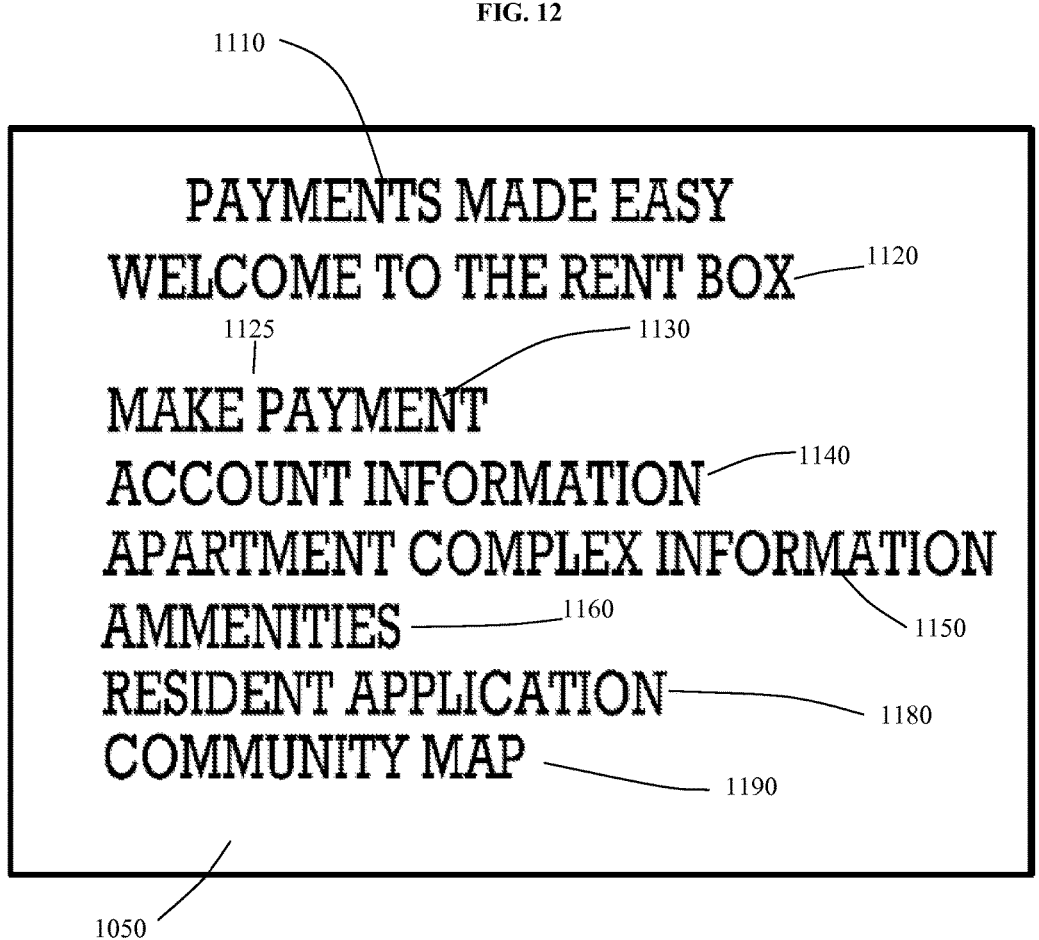
FIG. 12 is a screen view of an apparatus of FIG. 11.
Figure 13:
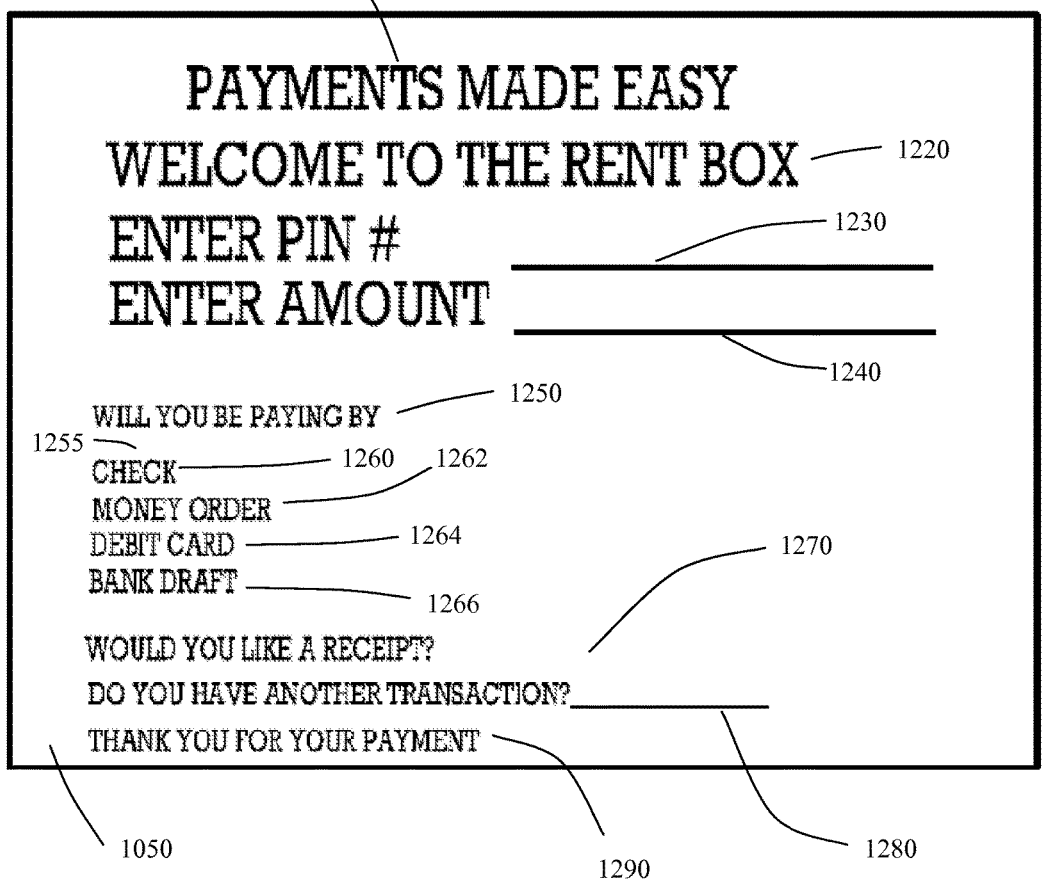
FIG. 13 is a screen view of an apparatus of FIG. 11
Figure 14:
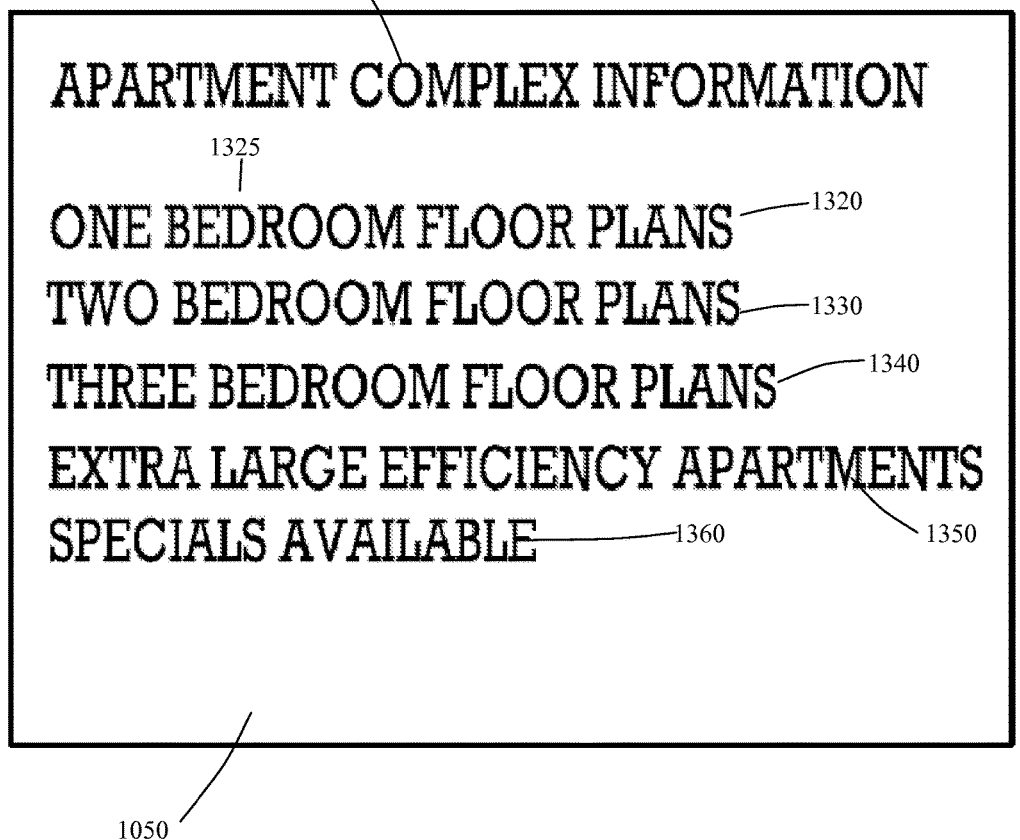
FIG. 14 is a screen view of an apparatus of FIG. 11
Figure 15:
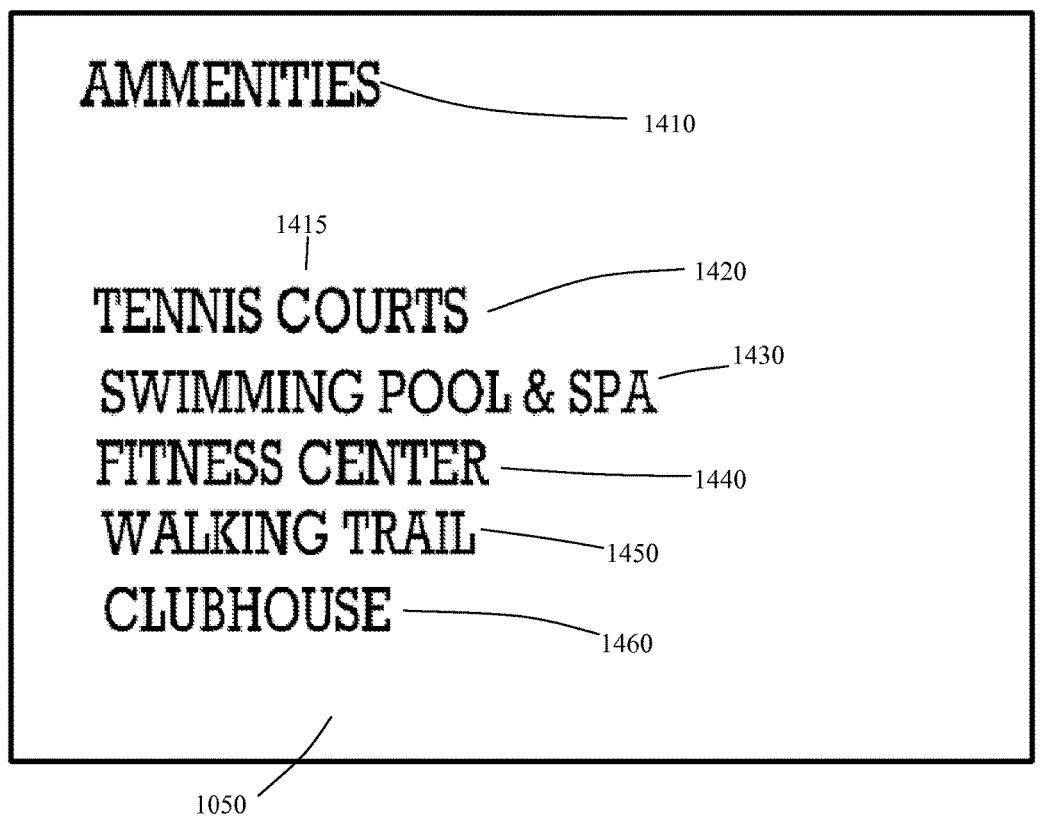
FIG. 15 is a screen view of an apparatus of FIG. 11
Figure 16:
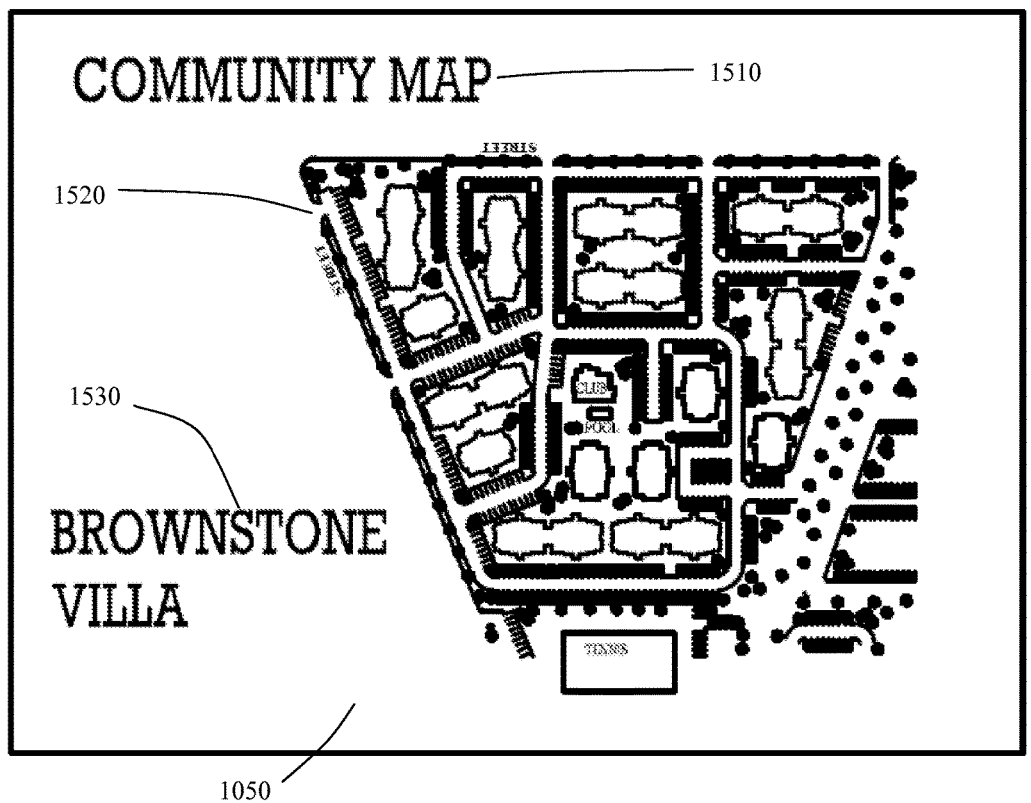
FIG. 16 is a screen view of an apparatus of FIG. 11

Referring now to another embodiment of the invention, in FIG. 11, FIG. 12, FIG. 13, FIG. 14, FIG. 15 and FIG. 16, a local payment collection and information management apparatus 1000 is illustrated being used for landlord/tenant services. FIG. 11 shows a front view of a local payment collection and information management apparatus 1000 which includes the labels 1075, 1081, 1083, 1085, 1095 that appear on the apparatus 1000 during use and shows users 1005 and their family 1006. FIG. 12, FIG. 13, FIG. 14, FIG. 15 and FIG. 16 illustrate a sampling of various screen views of a local payment collection and information management apparatus 1000. A local payment collection and information management apparatus 1000 comprises a screen 1050, a keypad 1060 and a camera 1056 extending through the display panel 1040 and a record opening 1070, a check document opening 1080, a cash document opening 1082, a money order document opening 1084 and a card reader 1090 extending through the front panel 1001. The record opening 1070 is labeled "RECEIPT" 1075, the check document opening 1080 is labeled "CHECK" 1081, the cash document opening 1082 is labeled "CASH" 1083, the money order document opening 1084 is labeled "MONEY ORDER" 1085 and the card reader 1090 is labeled "CREDIT/DEBIT" 1095. FIG. 12 shows a screen view of the screen 1050 when a user 1005 first approaches the apparatus 1000. The screen view in FIG. 12 displays the titles, "PAYMENTS MADE EASY" 1110 and "WELCOME TO THE RENT BOX" 1120; and a main menu 1125 with the choices of "MAKE PAYMENT" 1130, "ACCOUNT INFORMATION" 1140, "APARTMENT COMPLEX INFORMATION" 1150, "AMENITIES" 1160, "RESIDENT APPLICATION" 1180 and "COMMUNITY MAP" 1190. FIG. 13 shows a screen view of the screen 1050 as it appears after the user 1005 selects "MAKE PAYMENT" 1130 from the main menu 1125. The screen view in FIG. 13 displays the titles, "payments made easy" 1210 and "WELCOME TO THE RENT BOX" 1220; a field labeled "ENTER PIN #" 1230, which allows a user 1005 to enter identifying information; a field labeled "ENTER AMOUNT" 1240, which allows a user 1005 to enter the amount of a payment; a payment menu 1255, which is prefaced by the title, "WILL YOU BE PAYING BY" 1250, with the menu choices of "CHECK" 1260, "MONEY ORDER" 1262, "DEBIT CARD" 1264 and "BANK DRAFT" 1266; the fields "WOULD YOU LIKE A RECEIPT?" 1270, "DO YOU HAVE ANOTHER TRANSACTION?" 1280; and the ending title "THANK YOU FOR YOUR PAYMENT" 1290. FIG. 14 shows a screen view of the screen 1050 as it appears after the user 1005 selects "APARTMENT COMPLEX INFORMATION" 1150 from the main menu 1125. The screen view in FIG. 14 displays the title "APARTMENT COMPLEX INFORMATION" 1310 and the sales menu 1325 with the menu choices of "ONE BEDROOM FLOOR PLANS" 1320, "TWO BEDROOM FLOOR PLANS" 1330, "THREE BEDROOM FLOOR PLANS" 1340, "EXTRA LARGE EFFICIENCY APARTMENTS" 1350 and "SPECIALS AVAILABLE" 1360. FIG. 15 shows a screen view of the screen 1050 as it appears after the user 1005 selects "AMENITIES" 1160 from the main menu 1125. The screen view in FIG. 15 displays the title "AMENITIES" 1410 and the amenities menu 1415 with the menu choices of "TENNIS COURTS" 1420, "SWIMMING POOL & SPA" 1430, "FITNESS CENTER" 1440, "WALKING TRAIL" 1450 and "CLUBHOUSE" 1460. FIG. 16 shows a screen view of the screen 1050 as it appears after the user 1005 selects "COMMUNITY MAP" 1190 from the main menu 1125. The screen view in FIG. 16 displays the title "COMMUNITY MAP" 1510, a map 1520 of the apartment complex, and the name of the complex, "BROWNSTONE VILLA" 1530.

The advantages of the present invention include, without limitation, that it provides a means of a payer to pay an absent payee, even if that payer does not possess or have access to a bank account, a cashier's check provider, an electronic fund transfer service, a money order provider, a debit card, prepaid card service, credit card service or the like; that it allows payers to submit cash, or cash equivalent, payments in a safe and secure fashion; that it allows for the tracking of cash payments and for issuing records of cash payments in the form of data and images of the actual bills used for the payment; that it provides a means for payers to pay using modern conveniences, such as debit cards, credit cards, checks, money orders, electronic fund transfers or the like, if they are available to the payer; that it allows for an absent controller of the invention to provide a user of the invention with information, which may include pricing information, available products or services, marketing brochures, catalogues, images, directions, instructions, advertisements, pamphlets, flyers, payment records, statistics or the like; that it allows for the controller of the invention, or their agent, to collect payments, in particular cash payments, in a safe and secure manner and reduces the exposure to risk from personally collecting payments, particularly cash payments; that it provides a convenient means for the controller of the invention to gather information, such as payment information, marketing information or the like, and use that information for management purposes, reporting purposes, billing purposes, accounting purposes or the like; that it provides a convenient means for a payee to keep track of multiple payments or multiple payment types in instances in which a single payment is paid in a combination of ways. Furthermore, the present invention reduces transaction costs for the payee by eliminating or reducing the need for third parties service providers who charge fees for processing payments made, such as banks, credit card processing services, or management companies, and reduces transaction costs for the payer by eliminating or reducing the need for third parties service providers who charge fees for issuing payments, such as checks, cashier's checks, money orders, credit cards, debit cards, or the like, and by diminishing travel time involved in obtaining payments in the form of cashier's checks, money orders or the like.

In broad embodiment, the present invention is a local payment collection and information management apparatus comprising a secure outer cover, one or more user interfaces, a means of receiving payments, a means of scanning or imaging payments, a secure lock box for storing payments, and a system for retaining and retrieving information. The outer cover secures the interior modules and comprises a top panel, one or more display panels, a front panel, a plurality of side panels, a rear panel, and a base, which may be fixed in place. The inside of the outer cover may be accessed through an access door in the out cover which may be securely locked. A plurality of openings in the outer cover allow for interior modules to be extended to the exterior. The user interface allows users to enter and/or receive information from the apparatus and may comprise a display screen, a touchscreen, a keypad or the like, or a combination of these components. Embodiments with more than one user interface allow more than user to use and access the apparatus at the same time. The means of receiving payments comprises a drop slot, an opening in the outer cover, a portion of an internal module which extends through an opening in the outer cover from the interior or the like. The means of scanning or imaging payments comprises a card reader, a document reader, a scanner, a camera or the like, or a combination of these components. The secure lock box for storing payments is located within the interior of the outer cover and is accessible through the access door of the outer cover and may be separately accessed so that a payee, or their agent, may remove payments or payment documents from the lockbox. The secure lock box comprises a safe, a document stacker, a currency stacker or the like, or a combination of these components. The system for retaining and retrieving information comprises a computer, a server, a CPU, a CPU module, a CPU server, a memory device, a networked computer, a hard drive, a processor board or the like, or a combination of these components. A local payment collection and information management apparatus is a convenient and efficient means for an absent controller to provide information to users, to receive payments from payees without utilizing intermediaries and to gather data for management or accounting purposes.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. A method of managing rental property with cash-preferring payers, said method comprising:

providing an interactive apparatus located at said rental property, said interactive apparatus comprising:
a display;
a currency reader;
a lockbox;
a currency stacker, said currency stacker located within said lockbox;
an outer cover; said outer cover comprising:
a front panel, said front panel comprising:
a front panel plate,
a payment document opening for receiving cash payments,
a payment card opening,
a record opening for providing said cash-preferring payer a record of said cash payment;
a screen opening, said display extending through said screen opening, and
a keypad opening;
a rear panel; said rear panel comprising:
a rear panel plate and
a security door in said rear panel plate, said lockbox being accessible through said security door;
a right side panel;
a left side panel;
a top panel;
a base comprising:
a slab and
a plurality of footings;
a keypad, which extends through said keypad opening;
a printer located within said outer cover, which extends through said record opening;
a printer paper assembly located within said outer cover, which supplies paper for said printer;
a document reader located within said outer cover, which extends through said payment document opening;
a document stacker contained within said lockbox;
a card reader, which extends through said payment card opening;
a video module contained within said outer cover comprising:
a camera, and
a recorder, with said camera extending through said outer cover;
a processor configured to control said display, said currency reader, said currency stacker, said keypad, said printer, said printer paper assembly, said document reader, said document stacker, said card reader, said video module, and said lockbox, said processor contained within said outer cover;
wherein said currency reader is configured to interact with said lockbox, said currency stacker, and said processor;
wherein said lockbox is configured to interact with said currency reader, said currency stacker, said document reader, said document stacker, and said processor;
wherein said document reader is configured to interact with said lockbox, said document stacker, and said processor;
wherein said document stacker is configured to interact with said document reader, said lockbox, and said processor;
wherein said currency stacker is configured to interact with said currency reader, said lockbox, and said processor; and
a memory that stores said rental property's location-specific information on non-transitory computer-readable medium, said memory being accessible by said processor, said location-specific information comprising:
non-tenant information, said non-tenant information comprising:
marketing material for said rental property, directions regarding said rental property relative to said interactive apparatus, instructions for operating said interactive apparatus located at said rental property, promotional material regarding said rental property, pricing information regarding said rental property, available units at said rental property, advertising information, information regarding related services, images of said rental property, and video of said rental property;

tenant information, said tenant information comprising:

tenant-identifying information for one or more tenancies of said rental property, account history for said tenancies, information regarding available goods or services at said rental property, payment records for said tenancies, available payment plans for said tenancies, proof of payment for said tenancies, amount due for said tenancies, amount past due for said tenancies, and payment information regarding said tenancies; and payment-identifying information, said payment-identifying information comprising:

payer identity, tenant identity, tenancy information, payment account, payment amount, identification numbers, identification card information, and identification key information; and a hard drive located within said outer cover, which stores said memory, said hard drive configured to interact with said processor; providing said non-tenant information to a user by receiving a request for said non-tenant information from said user on said interactive apparatus, accessing said memory with said processor, retrieving said non-tenant information from said memory with said processor, filtering said non-tenant information for said requested non-tenant information by comparing said requested non-tenant information to said non-tenant information with said processor, converting said filtered said requested non-tenant information to displayable form with said processor, displaying said filtered said requested non-tenant information to said user on said display with said processor; and generating a non-tenant record of said requested non-tenant information using said printer, when requested by said user; and providing said tenant information to a tenant by receiving a request for said tenant information from said tenant, on said interactive apparatus, accessing said memory with said processor, retrieving said tenant information from said memory with said processor, filtering said tenant information for said requested tenant information by comparing said requested tenant information to said tenant information with said processor, converting said requested tenant information to displayable form with said processor, displaying said requested tenant information to said tenant on said display interacting with said processor, and generating a tenant record of said requested tenant information using said printer, when requested by said tenant; and collecting rent from said cash-preferring payer by receiving payment-identifying information from said cash-preferring payer, identifying said payment account with said received payment-identifying information using said processor, receiving a cash payment for said payment account from said cash-preferring payer, recording images of said cash payment in said memory using said currency reader interacting with said processor, stacking said cash payment in said currency stacker within said lockbox, storing said cash payment in said currency stacker within said lockbox, updating said tenant information in said memory to reflect said cash payment using said processor, converting said cash payment into collected rent for said payment account using said processor, generating a payer record of said cash payment using said printer, said payment record comprising: said recorded images of said cash payment, when requested by said payer;

wherein a landlord retrieves said cash payment from said lockbox at said rental property at a later time.

2. The method of claim 1, wherein said interactive apparatus located at said rental property is mounted on said base, said footings extend into the surface upon which said base is mounted in order to secure said interactive apparatus located at said rental property in place and said lockbox is mounted within said base.

3. The method of claim 1, wherein said interactive apparatus located at said rental property may be accessed by said cash-preferring payer and said landlord at the same time.

4. The method of claim 1, wherein said cash payment is received from said cash-preferring payer without using an intermediary other than said interactive apparatus located at said rental property, said intermediary comprising:

a bank, an employee of said landlord, a cashier's check provider, an electronic transfer service, a money order provider, a debit card service, a prepaid card service, a credit card service, and a third party service provider.

5. The method of claim 1, said interactive apparatus located at said rental property further comprising:

a security system, a plurality of cameras, a video camera, a plurality of video cameras, a digital camera, a plurality of digital cameras, a webcam, and/or a plurality of webcams;

in order to provide security monitoring for said rental property.

6. The method of claim 1, said outer cover of said interactive apparatus further comprising:

a touchscreen display panel, which comprises:

a display panel plate, a touchscreen opening, which extends through said display panel plate, and a touchscreen, which extends through said touchscreen opening; wherein said touchscreen provides said display.

7. The method of claim 1 wherein said cash payment further comprises a money order, said money order comprising: a cash-equivalent certificate that allows a payee stated on said certificate to receive cash on demand.

8. A system, which allows an absent landlord or absent authorized user to collect a cash payment from a tenant and to manage tenant account information, said system comprising:

an isolated rental property and an interactive apparatus located at said isolated rental property, said interactive apparatus comprising:

a display;

a currency reader;

a lockbox;

a currency stacker, said currency stacker located within said lockbox;

an outer cover; said outer cover comprising:

a front panel, said front panel comprising:

a front panel plate, a payment document opening for receiving cash payments, a payment card opening, a record opening for providing said cash-preferring payer a record of said cash payment;

a screen opening, said display extending through said screen opening, and a keypad opening;

a rear panel; said rear panel comprising:

a rear panel plate and a security door in said rear panel plate, said lockbox being accessible through said security door;

a right side panel;

a left side panel;

a top panel;

a base comprising:

a slab and a plurality of footings;

a keypad, which extends through said keypad opening;

a printer located within said outer cover, which extends through said record opening;
a printer paper assembly located within said outer cover, which supplies paper for said printer;
a document reader located within said outer cover, which extends through said payment document opening;
a document stacker contained within said lockbox;
a card reader, which extends through said payment card opening;
a video module contained within said outer cover comprising:
a camera, and a recorder, with said camera extending through said outer cover;
a processor configured to control said display, said currency reader, said currency stacker, said keypad, said printer, said printer paper assembly, said document reader, said document stacker, said card reader, said video module, and said lockbox, said processor contained within said outer cover;
wherein said currency reader is configured to interact with said lockbox, said currency stacker, and said processor;
wherein said lockbox is configured to interact with said currency reader, said currency stacker, said document reader, said document stacker, and said processor;
wherein said document reader is configured to interact with said lockbox, said document stacker, and said processor;
wherein said document stacker is configured to interact with said document reader, said lockbox, and said processor;
wherein said currency stacker is configured to interact with said currency reader, said lockbox, and said processor; and
a memory that stores said isolated rental property's location-specific information on non-transitory computer-readable medium, said memory being accessible by said processor, said location-specific information comprising:
non-tenant information, said non-tenant information comprising:
marketing material for said rental property, directions regarding said rental property relative to said interactive apparatus, instructions for operating said interactive apparatus located at said rental property, promotional material regarding said rental property, pricing information regarding said rental property, available units at said rental property, advertising information, information regarding related services, images of said rental property, and video of said rental property;
tenant information, said tenant information comprising:
tenant-identifying information for one or more tenancies of said isolated rental property, account history for said tenancies, information regarding available goods or services at said rental property, payment records for said tenancies, available payment plans for said tenancies, proof of payment for said tenancies, amount due for said tenancies, address of said tenancies, amount past due for said tenancies, and payment information regarding said tenancies; and payment-identifying information, said payment-identifying information comprising:

payer identity, tenant identity, tenancy information, payment account, payment amount, identification numbers, identification card information, and identification key information; and
a hard drive located within said outer cover, which stores said memory, said hard drive configured to interact with said processor;
wherein said interactive apparatus provides said non-tenant information to a user by receiving a request for said non-tenant information from said user on said interactive apparatus, accessing said memory with said processor, retrieving said non-tenant information from said memory with said processor, filtering said non-tenant information for said requested non-tenant information by comparing said requested non-tenant information to said non-tenant information with said processor, converting said filtered said requested non-tenant information to displayable form with said processor, displaying said filtered said requested non-tenant information to said user on said display with said processor; and
generating a non-tenant record of said requested non-tenant information using said printer, when requested by said user; and
wherein said interactive apparatus provides said tenant information to said tenant by receiving a request for said tenant information from said tenant, on said interactive apparatus, accessing said memory with said processor, retrieving said tenant information from said memory with said processor, filtering said tenant information for said requested tenant information by comparing said requested tenant information to said tenant information with said processor, converting said requested tenant information to displayable form with said processor, displaying said requested tenant information to said tenant on said display interacting with said processor, and generating a tenant record of said requested tenant information using said printer, when requested by said tenant; and wherein said interactive apparatus collects rent from said tenant by receiving payment-identifying information from said tenant, identifying said payment account with said received payment-identifying information using said processor, receiving said cash payment from said tenant, recording images of said cash payment in said memory using said currency reader interacting with said processor, storing said cash payment in said currency stacker within said lockbox, updating said tenant information in said memory to reflect said cash payment using said processor; converting said cash payment into collected rent for said tenant using said processor, generating a payer record of said cash payment using said printer, said payment record comprising: said recorded images of said cash payment, when requested by said tenant;
wherein said absent landlord or said absent authorized user retrieves said cash payment from said lockbox at said isolated rental property at a later time.

9. The system of claim 8 wherein said cash payment further comprises a money order, said money order comprising: a cash-equivalent certificate that allows a payee stated on said certificate to receive cash on demand.

* * * * *